United States Patent
Sun et al.

(10) Patent No.: US 11,258,610 B2
(45) Date of Patent: Feb. 22, 2022

(54) METHOD AND MOBILE TERMINAL OF SHARING SECURITY APPLICATION IN MOBILE TERMINAL

(71) Applicant: Advanced New Technologies Co., Ltd., Grand Cayman (KY)

(72) Inventors: Xi Sun, Hangzhou (CN); Hongwei Luo, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/158,702

(22) Filed: Jan. 26, 2021

(65) Prior Publication Data

US 2021/0152362 A1 May 20, 2021

Related U.S. Application Data

(63) Continuation of application No. PCT/CN2019/097061, filed on Jul. 22, 2019.

(30) Foreign Application Priority Data

Oct. 12, 2018 (CN) .......................... 201811186977.1

(51) Int. Cl.
*H04L 9/32* (2006.01)
*H04L 9/08* (2006.01)

(52) U.S. Cl.
CPC .......... *H04L 9/3234* (2013.01); *H04L 9/0825* (2013.01); *H04L 9/0827* (2013.01)

(58) Field of Classification Search
CPC ....... H04L 9/3234; H04L 9/0827; H04L 9/32; H04L 9/08; H04L 9/0825; H04L 63/0853
See application file for complete search history.

(56) References Cited

U.S. PATENT DOCUMENTS

| | | |
|---|---|---|
| 5,307,410 A | 4/1994 | Bennett |
| 5,675,648 A | 10/1997 | Townsend |
| 6,505,247 B1 | 1/2003 | Steger |

(Continued)

FOREIGN PATENT DOCUMENTS

| | | |
|---|---|---|
| CN | 101222488 | 7/2008 |
| CN | 101741852 | 6/2010 |

(Continued)

OTHER PUBLICATIONS

Tien-Sheng Lin, et al., Quantulm Aulthentication and Secure Communication Protocols, 2006 IEEE (Year:2006).

(Continued)

*Primary Examiner* — Quazi Farooqui
(74) *Attorney, Agent, or Firm* — Shun Yao; Yao Legal Services, Inc.

(57) ABSTRACT

One embodiment provides a system and method for sharing a security application. During operation, the security application receives a service key associated with a first application executed on a terminal device. The security application resides in a secure element within the terminal device. The security application receives service data associated with the first application; processes the service data based on the service key; and returns the processed service data to the first application, thereby facilitating the first application in performing service based on the processed service data.

18 Claims, 12 Drawing Sheets

(56) References Cited

U.S. PATENT DOCUMENTS

| | | |
|---|---|---|
| 8,041,335 B2 | 10/2011 | Khetawat |
| 8,266,433 B1 | 9/2012 | Przykucki |
| 8,990,550 B1 | 3/2015 | Hushon |
| 9,077,577 B1 | 7/2015 | Ashrafi |
| 9,130,742 B2 | 9/2015 | Yao |
| 9,294,267 B2 | 3/2016 | Kamath |
| 9,323,901 B1 | 4/2016 | Nair |
| 9,698,979 B2 | 7/2017 | Armstrong |
| 9,830,467 B1 | 11/2017 | Harold |
| 9,887,976 B2 | 2/2018 | Hughes |
| 2001/0023416 A1 | 9/2001 | Hosokawa |
| 2005/0071632 A1 | 3/2005 | Pauker |
| 2005/0071677 A1 | 3/2005 | Khanna |
| 2005/0135620 A1 | 6/2005 | Kastella |
| 2005/0144440 A1 | 6/2005 | Catherman |
| 2005/0144484 A1 | 6/2005 | Wakayama |
| 2005/0259825 A1 | 11/2005 | Trifonov |
| 2006/0026693 A1 | 2/2006 | Bade |
| 2006/0056630 A1 | 3/2006 | Zimmer |
| 2006/0155922 A1 | 7/2006 | Gorobets |
| 2007/0016794 A1 | 1/2007 | Harrison |
| 2007/0076889 A1 | 4/2007 | Derobertis |
| 2007/0147292 A1 | 6/2007 | Van Ewijk |
| 2007/0192598 A1 | 8/2007 | Troxel |
| 2008/0065881 A1 | 3/2008 | Dawson |
| 2008/0114983 A1 | 5/2008 | Sherkin |
| 2008/0123859 A1 | 5/2008 | Mamidwar |
| 2008/0165973 A1 | 7/2008 | Miranda Gavillan |
| 2008/0219449 A1 | 9/2008 | Ball |
| 2008/0222734 A1 | 9/2008 | Redlich |
| 2009/0019285 A1 | 1/2009 | Chen |
| 2009/0034733 A1 | 2/2009 | Raman |
| 2009/0055892 A1 | 2/2009 | Lu |
| 2009/0092252 A1 | 4/2009 | Noll |
| 2009/0106551 A1 | 4/2009 | Boren |
| 2009/0125444 A1 | 5/2009 | Cochran |
| 2009/0147958 A1 | 6/2009 | Calcaterra |
| 2009/0193184 A1 | 7/2009 | Yu |
| 2009/0204812 A1 | 8/2009 | Baker |
| 2009/0262942 A1 | 10/2009 | Maeda |
| 2009/0271634 A1 | 10/2009 | Boult |
| 2010/0132015 A1 | 5/2010 | Lee |
| 2010/0169953 A1 | 7/2010 | Hofer |
| 2010/0199336 A1 | 8/2010 | Tan |
| 2010/0211787 A1 | 8/2010 | Bukshpun |
| 2010/0265077 A1 | 10/2010 | Humble |
| 2010/0277435 A1 | 11/2010 | Han |
| 2010/0299526 A1 | 11/2010 | Wiseman |
| 2011/0069972 A1 | 3/2011 | Wiseman |
| 2011/0099367 A1 | 4/2011 | Thom |
| 2011/0126011 A1 | 5/2011 | Choi |
| 2011/0167503 A1 | 7/2011 | Horal |
| 2011/0209202 A1 | 8/2011 | Otranen |
| 2011/0213979 A1 | 9/2011 | Wiseman |
| 2011/0231615 A1 | 9/2011 | Ober |
| 2012/0032781 A1 | 2/2012 | Moon |
| 2012/0045002 A1 | 2/2012 | Zivkovic |
| 2012/0084570 A1 | 4/2012 | Kuzin |
| 2012/0087500 A1 | 4/2012 | Ukita |
| 2012/0166993 A1 | 6/2012 | Anderson |
| 2012/0177201 A1 | 7/2012 | Ayling |
| 2012/0210408 A1 | 8/2012 | Lu |
| 2012/0250863 A1 | 10/2012 | Bukshpun |
| 2012/0265892 A1 | 10/2012 | Ma |
| 2013/0083926 A1 | 4/2013 | Hughes |
| 2013/0101119 A1 | 4/2013 | Nordholt |
| 2013/0138875 A1 | 5/2013 | Kamphenkel |
| 2013/0142336 A1 | 6/2013 | Fries |
| 2013/0159704 A1 | 6/2013 | Chandrasekaran |
| 2013/0208894 A1 | 8/2013 | Bovino |
| 2013/0219454 A1 | 8/2013 | Hewinson |
| 2013/0227286 A1 | 8/2013 | Brisson |
| 2013/0246641 A1 | 9/2013 | Vimpari |
| 2013/0251145 A1 | 9/2013 | Lowans |
| 2013/0259233 A1 | 10/2013 | Baba |
| 2013/0262873 A1 | 10/2013 | Read |
| 2013/0267204 A1 | 10/2013 | Schultz |
| 2013/0308506 A1 | 11/2013 | Kim |
| 2013/0311707 A1 | 11/2013 | Atsushi |
| 2013/0315395 A1 | 11/2013 | Jacobs |
| 2014/0068765 A1 | 3/2014 | Choi |
| 2014/0104137 A1 | 4/2014 | Brown |
| 2014/0141725 A1 | 5/2014 | Jesme |
| 2014/0173713 A1 | 6/2014 | Zheng |
| 2014/0237565 A1 | 8/2014 | Fleysher |
| 2014/0259138 A1 | 9/2014 | Fu |
| 2014/0281500 A1 | 9/2014 | Ignatchenko |
| 2014/0281511 A1 | 9/2014 | Kaushik |
| 2014/0281548 A1* | 9/2014 | Boyer ............... H04L 63/10 713/171 |
| 2014/0331050 A1 | 11/2014 | Armstrong |
| 2014/0351915 A1 | 11/2014 | Otranen |
| 2015/0046709 A1 | 2/2015 | Anspach |
| 2015/0062904 A1 | 3/2015 | Sanga |
| 2015/0074337 A1 | 3/2015 | Jo |
| 2015/0089624 A1 | 3/2015 | Kim |
| 2015/0095987 A1 | 4/2015 | Potash |
| 2015/0134727 A1 | 5/2015 | Lee |
| 2015/0134947 A1 | 5/2015 | Varcoe |
| 2015/0181308 A1 | 6/2015 | Ducharme |
| 2015/0193338 A1 | 7/2015 | Sundaram |
| 2015/0207926 A1 | 7/2015 | Brown |
| 2015/0222619 A1 | 8/2015 | Hughes |
| 2015/0236852 A1 | 8/2015 | Tanizawa |
| 2015/0263855 A1 | 9/2015 | Schulz |
| 2015/0270963 A1 | 9/2015 | Tanizawa |
| 2015/0271147 A1 | 9/2015 | Tanizawa |
| 2015/0288517 A1 | 10/2015 | Evans |
| 2015/0288542 A1 | 10/2015 | Ashrafi |
| 2015/0309924 A1 | 10/2015 | Chen |
| 2015/0317469 A1 | 11/2015 | Liu |
| 2015/0325242 A1 | 11/2015 | Lu |
| 2015/0326613 A1 | 11/2015 | Devarajan |
| 2015/0350181 A1 | 12/2015 | Call |
| 2015/0379261 A1 | 12/2015 | Daigle |
| 2015/0381363 A1 | 12/2015 | Teixeira |
| 2016/0013937 A1 | 1/2016 | Choi |
| 2016/0021068 A1 | 1/2016 | Jueneman |
| 2016/0080708 A1 | 3/2016 | Urata |
| 2016/0087946 A1 | 3/2016 | Yang |
| 2016/0087950 A1* | 3/2016 | Barbir ............... H04L 63/062 713/171 |
| 2016/0105439 A1 | 4/2016 | Hunt |
| 2016/0127127 A1 | 5/2016 | Zhao |
| 2016/0149700 A1 | 5/2016 | Fu |
| 2016/0210105 A1 | 7/2016 | Ru |
| 2016/0226846 A1 | 8/2016 | Fu |
| 2016/0241396 A1 | 8/2016 | Fu |
| 2016/0248581 A1 | 8/2016 | Fu |
| 2016/0283116 A1 | 9/2016 | Ramalingam |
| 2016/0283125 A1 | 9/2016 | Hashimoto |
| 2016/0294783 A1 | 10/2016 | Piqueras Jover |
| 2016/0306552 A1 | 10/2016 | Liu |
| 2016/0313943 A1 | 10/2016 | Hashimoto |
| 2016/0337329 A1 | 11/2016 | Sood |
| 2016/0357452 A1 | 12/2016 | Kadam |
| 2016/0359839 A1 | 12/2016 | Natividad |
| 2016/0366713 A1 | 12/2016 | Sonnino |
| 2017/0034167 A1 | 2/2017 | Figueira |
| 2017/0104588 A1 | 4/2017 | Camenisch |
| 2017/0214525 A1 | 7/2017 | Zhao |
| 2017/0230173 A1 | 8/2017 | Choi |
| 2017/0302448 A1 | 10/2017 | Luk |
| 2017/0324730 A1 | 11/2017 | Otranen |
| 2017/0371585 A1 | 12/2017 | Lazo |
| 2018/0048466 A1 | 2/2018 | Chen |
| 2018/0063709 A1 | 3/2018 | Morrison |
| 2018/0077449 A1 | 3/2018 | Herz |
| 2018/0262907 A1 | 9/2018 | Alanis |
| 2018/0351734 A1 | 12/2018 | Zhao |
| 2019/0103962 A1 | 4/2019 | Howe |
| 2019/0179751 A1 | 6/2019 | Kanno |

(56) References Cited

U.S. PATENT DOCUMENTS

2019/0391756 A1 12/2019 Wang
2020/0201570 A1 6/2020 Kim

FOREIGN PATENT DOCUMENTS

| | | |
|---|---|---|
| CN | 102946313 | 2/2013 |
| CN | 104486307 | 4/2015 |
| CN | 104579694 | 4/2015 |
| CN | 104780040 | 7/2015 |
| EP | 0962070 | 12/1999 |
| EP | 3007478 | 4/2016 |
| WO | 2012098543 | 7/2012 |
| WO | 2013026086 | 2/2013 |
| WO | 2016070141 | 5/2016 |

OTHER PUBLICATIONS

Charles H. Bennett et al., Quantum cryptography: Public key distribution and coin tossing, www.elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998 IEEE.

Lanjun Dang, An Improved Mutual Authentication Scheme for Smart Card Secure Messaging, Proceedings of the IEEE International Conference on E-Commerce Technology for Dynamic E-Business (CEC—East'04), 2004.

Wenjie Liu, et al., Authenticated Quantum Secure Direct Communication with Qutrits, Fourth International Conference on Natural Computation, IEEE 2008.

Mark Hillery et al. "Quantum Secret Sharing", American Physical Society 1999.

J G Rarity et al. "Ground to satellite secure key exchange using quantum cryptography", New Journal of Physics 2002.

Richard J Hughes et al. "Practical free-space quantum key distribution over 10 km in daylight and at night", New Journal of Physics 2002.

Baker et al. "Recommendation for Key Management—Part 1: General (Revision 3)", NIST Special Publication 800-57, Jul. 2012 (Year:2012).

Sufyan T. Faraj, "A Novel Extension of SSL/TLS Based on Quantum Key Distribution", Computer and Communication Engineering, 2008. ICCCE 2008. International Conference on, IEEE, Piscataway, NJ, USA, May 16, 2008, pp. 919-922.

Kim et al. "A space-Efficient Flash Translation layer for CompactFlash Systems." May 2002. IEEE. IEEE Transactions on Consumer Electronics. vol. 48. pp 366-375.

Kang et al. "The Multi-Streamed Solid-State Drive." Jun. 2014. USENIX. Hotstorage '14.

Bhimani et al. "FIOS: Feature Based I/O Stream Identification for Improving Endurance of Multi-Stream SSDs" Jul. 2018. IEEE. 11th International Conference on Cloud Computing. pp 17-24.

* cited by examiner

METHOD AND MOBILE TERMINAL OF SHARING SECURITY APPLICATION IN MOBILE TERMINAL

RELATED APPLICATION

Under 35 U.S.C. § 120 and § 365(c), this application is a continuation of PCT Application No. PCT/CN2019/097061, entitled "METHOD AND MOBILE TERMINAL OF SHARING SECURITY APPLICATION IN MOBILE TERMINAL," by inventors Xi Sun and Hongwei Luo, filed 22 Jul. 2019, which claims priority to Chinese Patent Application No. 201811186977.1, filed on 12 Oct. 2018.

TECHNICAL FIELD

The present application relates to the field of mobile terminals, and relates, in particular, to a method and a mobile terminal of sharing a security application in a mobile terminal.

BACKGROUND

With the development of the mobile Internet, a mobile terminal such as a smartphone or a tablet computer has increasingly powerful functions and increasingly strong processing performance. It can access a mobile communication network, can provide an open operating system for an application program development interface, and can also allow various types of application software to be installed and run therein; therefore, more attention has been paid to the security of the mobile terminal. In order to improve the security of the mobile terminal, the mobile terminal integrates a secure element (SE), which provides a secure data storage and computing environment. Mobile terminals equipped with secure elements are widely applied in various business scenarios with high security requirements. In current technologies, when a secure element is used to improve the security of a mobile terminal, it is usually necessary to install a corresponding independent security application (an application running in the secure element) in the secure element for each mobile application, and the independent security application is responsible for fulfilling secure computing requirements of the mobile application, thus having higher development and promotion costs.

In order to avoid the unnecessary security application development cost and reduce the promotion cost, it is necessary to provide a solution that can reduce the R&D and promotion costs, and can also ensure independence and security of secure computing and data of the mobile application, thereby reducing costs for the mobile application performing secure computing using the secure element.

SUMMARY

Embodiments of the present application provide a method and a mobile terminal of sharing a security application in a mobile terminal, for solving the problem of high R&D and promotion costs of the security application.

One embodiment provides a system and method for sharing a security application. During operation, the security application receives a service key associated with a first application executed on a terminal device. The security application resides in a secure element within the terminal device. The security application receives service data associated with the first application; processes the service data based on the service key; and returns the processed service data to the first application, thereby facilitating the first application in performing service based on the processed service data.

In a variation on this embodiment, the security application receives a communication security protection key associated with the first application. Receiving the service data comprises receiving encrypted service data. The security application performs decryption using the communication security protection key on the received encrypted service data to obtain the service data.

In a further variation, the communication security protection key is generated by a management server of the security application or a management server of the first application.

In a further variation, the communication security protection key comprises one of: a symmetric key and a private key of an asymmetric key pair. A public key of the asymmetric key pair is used by the first application to encrypt the service data.

In a variation on this embodiment, the security application receives additional service keys respectively associated with additional applications. Service keys of different applications are securely isolated in the security application. The security application processes service data received from the additional applications respectively using the additional service keys corresponding to the additional applications.

In a further variation, the security application comprises a first security application and a second security application. The first security application is configured to process service data associated with a first portion of the additional applications based on a first portion of service keys associated with the first portion of the additional applications. The second security application is configured to process service data associated with a second portion of the additional applications based on a second portion of service keys associated with the first portion of the additional applications.

In a variation on this embodiment, the service key is generated by a management server of the security application or a management server of the first application.

In a variation on this embodiment the service key comprises one of: a symmetric key, and a private or public key of an asymmetric key pair.

In a variation on this embodiment, the first application is executed in a trusted computing environment or a rich execution environment within the terminal device.

The embodiments of the present application provide a method of sharing a security application in a mobile terminal, wherein the mobile terminal can run a plurality of mobile applications, wherein the mobile terminal further comprises a security application, and the method comprising:

receiving, by the security application, service keys of a plurality of mobile applications;

receiving, by the security application, encrypted service data sent by the plurality of mobile applications and performing decryption to obtain respective decrypted service data;

processing, by the security application, respective corresponding service data by using the service keys of the plurality of mobile applications; and sending, by the security application, the processed respective corresponding service data to the corresponding mobile applications.

Preferably, the method further comprises:

receiving, by the mobile applications, communication security protection keys of the mobile applications; and wherein receiving, by the security application, encrypted service data sent by the plurality of mobile applications and performing decryption comprises:

receiving, by the security application, service data that are sent and encrypted using respective communication security protection keys by the plurality of mobile applications; and obtaining, by the security application, the respective service data after performing decryption using the respective communication security protection keys of the plurality of mobile applications.

Preferably, the security application comprises a first security application and a second security application;

a portion of the several mobile applications communicates with the first security application, and another portion of the several mobile applications communicates with the second security application.

Preferably, the method further comprises:

generating, by management servers of the mobile applications, the communication security protection keys of the mobile applications, and sending the communication security protection keys of the mobile applications to the mobile applications and a management server of the security application; and sending, by the management server of the security application, the communication security protection keys of the mobile applications to the security application; and/or, generating, by the management servers of the mobile applications, the service keys of the mobile applications, and sending the service keys of the mobile applications to the management server of the security application; and sending, by the management server of the security application, the service keys of the mobile applications to the security application.

Preferably, the method further comprises:

generating, by the management servers of the mobile applications, the communication security protection keys and the service keys of the mobile applications, and sending the communication security protection keys and the service keys of the mobile applications to the management server of the security application;

sending, by the management server of the security application, the communication security protection keys and the service keys of the mobile applications to the security application; and sending, by the management servers of the mobile applications, the communication security protection keys of the mobile applications to the mobile applications.

Preferably, the method further comprises:

generating, by the management server of the security application, the communication security protection keys of the mobile applications, and sending the communication security protection keys of the mobile applications to the management servers of the mobile applications;

generating, by the management servers of the mobile applications, the service keys of the mobile applications, and sending the service keys of the mobile applications to the management server of the security application; and sending, by the management servers of the mobile applications, the communication security protection keys of the mobile applications to the mobile applications, and sending, by the management server of the security application, the communication security protection keys and the service keys of the mobile applications to the security application.

Preferably, the service keys of the several mobile applications are securely isolated in the security application; and/or the communication security protection keys of the several mobile applications are securely isolated in the security application.

Preferably, the service keys of the mobile applications are symmetric keys or asymmetric keys;

when the service keys of the mobile applications are symmetric keys, processing the corresponding service data comprises encrypting the service data or decrypting the service data; and when the service keys of the mobile applications are asymmetric keys, processing the corresponding service data comprises encrypting the service data, decrypting the service data, signing the service data, or verifying signatures of the service data.

Preferably, the communication security protection keys of the mobile applications are symmetric keys or asymmetric keys; wherein in the case where the communication security protection keys of the mobile applications are asymmetric keys, the communication security protection keys of the mobile applications received by the mobile applications are public keys, and the communication security protection keys of the mobile applications received by the security application are private keys.

Preferably, sending, by the security application, the processed service data to the mobile applications comprises:

signing, by the security application, the processed service data using the private keys and sending it to the mobile applications.

Preferably, the execution environment is a rich execution environment and/or a trusted execution environment.

Preferably, the several mobile applications communicate with the security application through a security application proxy.

The embodiments of the present application provide a mobile terminal, wherein the mobile terminal can run a plurality of mobile applications, and the mobile terminal further comprises a security application;

the security application is configured to receive service keys of the plurality of mobile applications; receive encrypted service data sent by the plurality of mobile applications, and perform decryption to obtain respective decrypted service data; and the security application is further configured to process respective corresponding service data by using the service keys of the plurality of mobile applications; and send the processed respective corresponding service data to the corresponding mobile applications.

Preferably, the mobile applications are further configured to receive communication security protection keys of the plurality of mobile applications; and the security application is further configured to receive the service data that are sent and encrypted using respective communication security protection keys by the plurality of mobile applications; and obtain respective service data after performing decryption using the respective communication security protection keys of the plurality of mobile applications.

The embodiments of the present application provide a mobile terminal, comprising a processor, a first memory, a secure element, and a second memory, wherein the first memory stores programs corresponding to a plurality of mobile applications, and the second memory stores a program corresponding to a security application, the secure element is configured to execute the program corresponding to the security application to receive service keys of the plurality of mobile applications; and receive encrypted service data sent by the processor and perform decryption to obtain respective decrypted service data; and the secure element is further configured to process respective corresponding service data by using the service keys of the plurality of mobile applications; and send the processed respective corresponding service data to the corresponding mobile applications.

Preferably, the processor is further configured to receive communication security protection keys of the plurality of mobile applications; and the secure element is further configured to receive the service data sent and encrypted using the respective communication security protection keys of the plurality of security applications by the processor; and obtain the respective service data after performing decryption using the respective communication security protection keys of the plurality of mobile applications.

Preferably, the security application comprises a first security application and a second security application;

a portion of the plurality of mobile applications communicate with the first security application, and the other portion of the plurality of mobile applications communicate with the second security application.

Preferably, the service keys of the plurality of mobile applications are securely isolated in the second memory; and/or the communication security protection keys of the plurality of mobile applications are securely isolated in the second memory.

Preferably, the service keys of the plurality of mobile applications are symmetric keys or asymmetric keys. In the case where the service keys of the mobile applications are symmetric keys, processing the corresponding service data comprises encrypting the service data or decrypting the service data. In the case where the service keys of the mobile applications are asymmetric keys, processing the corresponding service data comprises encrypting the service data, decrypting the service data, signing the service data, or verifying signatures of the service data.

Preferably, the communication security protection keys of the plurality of mobile applications are symmetric keys or asymmetric keys; wherein, in the case where the communication security protection keys of the mobile applications are asymmetric keys, the communication security protection keys of the mobile applications received by the processor are public keys, and the communication security protection keys of the mobile applications received by the secure element are private keys.

Preferably, the secure element is further configured to sign the processed service data by using the private keys and send the signed processed service data to the processor.

The embodiments of the present application provide a system of sharing a security application. The mobile terminal, the management servers of a plurality of mobile applications, and the management server of the security application of the system are characterized in that:

the management servers of the mobile applications are configured to generate communication security protection keys and service keys of the plurality of mobile applications, send the communication security protection keys of the plurality of mobile applications to the mobile applications, and send the communication security protection keys and the service keys of the plurality of mobile applications to the management server of the security application; and the management server of the security application is configured to send the communication security protection keys and the service keys of the plurality of mobile applications to the security application.

The embodiments of the present application provide a system of sharing a security application. The system comprises the mobile terminal, management servers of programs corresponding to a plurality of mobile applications, and a management server of a program corresponding to a security application, characterized in that:

the management servers of the plurality of mobile applications are configured to generate service keys of the plurality of mobile applications, and send the service keys of the plurality of mobile applications to the management server of the security application; and the management server of the security application is further configured to send the service keys to the security application.

Preferably, the management server of the security application is further configured to generate communication security protection keys of the plurality of mobile applications; and send the communication security protection keys of the plurality of mobile applications to the management servers of the plurality of mobile applications, and send the communication security protection keys of the plurality of mobile applications to the security application; and the management servers of the plurality of mobile applications are further configured to send the communication security protection keys of the plurality of mobile applications to the mobile applications.

The embodiments of the present application provide a system of sharing a program corresponding to a security application. The system comprises the mobile terminal, management servers of programs corresponding to a plurality of mobile applications, and a management server of a program corresponding to a security application, characterized in that:

the management servers of the programs corresponding to the plurality of mobile applications are configured to generate service keys of the plurality of mobile applications, and send the service keys of the plurality of mobile applications to the management server corresponding to the security application; and the management server of the program corresponding to the security application is configured to send the service keys of the plurality of mobile applications to the secure element.

Preferably, the management servers of the programs corresponding to the plurality of mobile applications are further configured to generate communication security protection keys of the plurality of mobile applications; send the communication security protection keys of the plurality of mobile applications to the processor; and send the communication security protection keys of the plurality of mobile applications to the management server of the program corresponding to the security application; and the management server of the program corresponding to the security application is further configured to send the communication security protection keys of the plurality of mobile applications to the secure element.

The embodiments of the present application provide a system of sharing a program corresponding to a security application. The system comprises the mobile terminal, management servers of programs corresponding to a plurality of mobile applications, and a management server of a program corresponding to a security application, characterized in that:

the management servers of the programs corresponding to the mobile applications are configured to generate service keys of the plurality of mobile applications, and send the service keys of the plurality of mobile applications to the management server of the program corresponding to the security application; and the management server of the program corresponding to the security application is further configured to send the service keys of the plurality of mobile applications to the secure element.

Preferably, the management server of the program corresponding to the security application is further configured to generate communication security protection keys of the plurality of mobile applications; send the communication security protection keys of the plurality of mobile applications to the management servers of the programs corresponding to the mobile applications; and send the communication security protection keys of the plurality of mobile applications to the secure element; and the management servers of the programs corresponding to the mobile applications are further configured to send the communication security protection keys of the plurality of mobile applications to the processor.

The above at least one technical solution adopted in the embodiments of the present application can achieve the following beneficial effects:

By allowing these mobile applications to share a security application in a secure element, embodiments of the present application eliminate the need to independently develop application software development kits for these mobile applications, thus greatly reducing costs of the mobile applications using the secure element to perform secure computing, speeding up the popularization of secure computing based on secure elements, and guaranteeing product and service security. In addition, the embodiments of the present application can also ensure the independence and security of secure computing and data of different mobile applications by means of security isolation within the shared security application.

BRIEF DESCRIPTION OF THE DRAWINGS

The accompanying drawings described here are used to provide a further understanding of the present application and constitute a part of the present application. The exemplary embodiments of the present application and descriptions thereof are used to explain the present application, but do not constitute an improper limitation to the present application. In the accompanying drawings.

DETAILED DESCRIPTION

Figure 1:
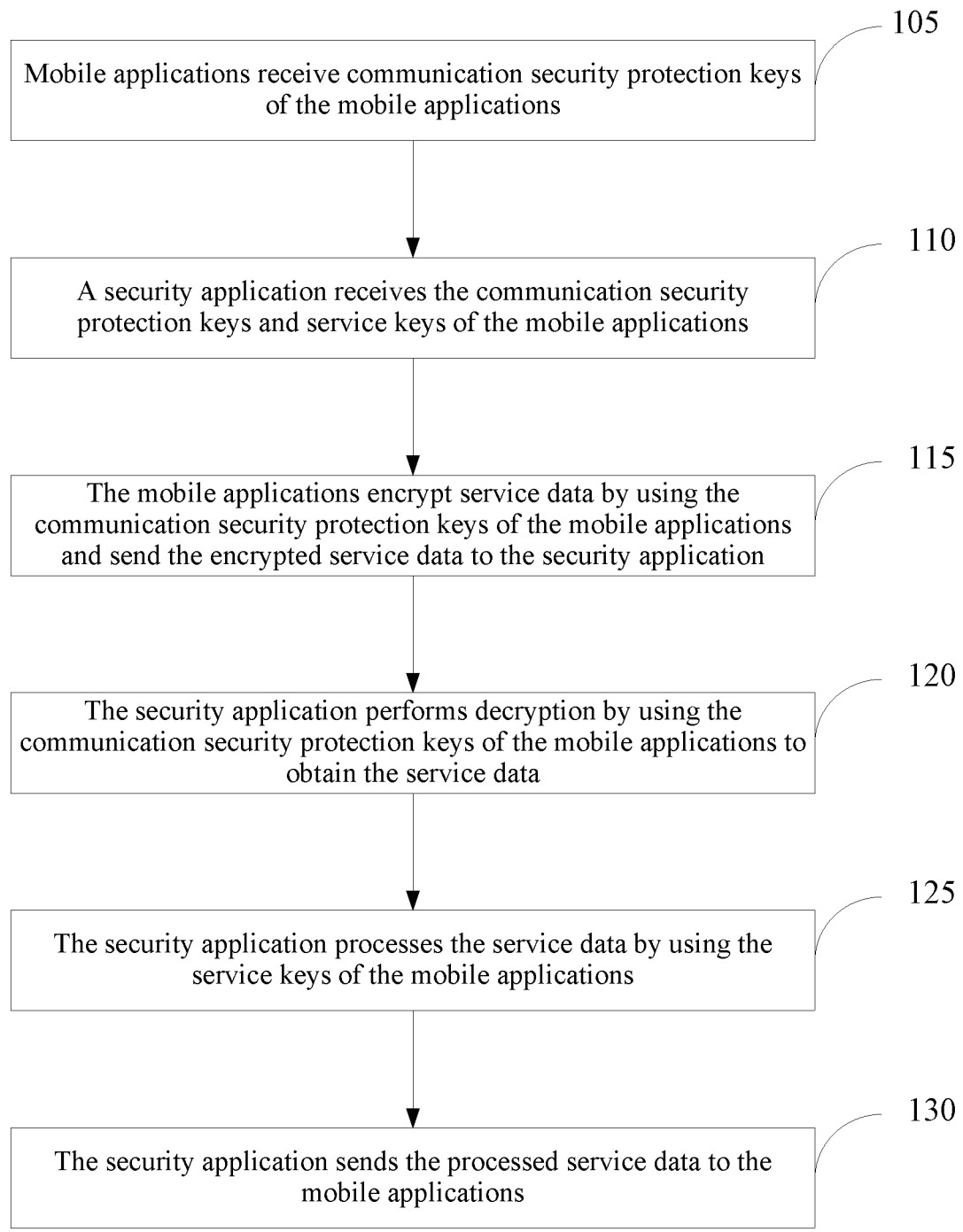
FIG. 1 is a schematic diagram of a method of sharing a security application according to Embodiment 1 of the present application.

In order to make the objectives, technical solutions and advantages of the present application clearer, the technical solutions of the present application will be described clearly and completely with reference to specific embodiments of the present application and the corresponding accompanying drawings. Obviously, the described embodiments are only a part of the embodiments of the present application, rather than all the embodiments. Based on the embodiments in the present application, all other embodiments obtained by those of ordinary skill in the art without creative efforts shall fall within the protection scope of the present application.

The technical solutions provided by the embodiments of the present application will be described in detail below with reference to the accompanying drawings.

A mobile terminal contains an Execution Environment, which is a set of software and hardware existing in a mobile device, capable of providing necessary capability support for operation of application programs in the mobile device, and generally including components such as a hardware processing unit, a volatile storage unit, a non-volatile storage unit, an operating system, a call interface, etc. The execution environment may be a Rich Execution Environment or a Trusted Execution Environment. The rich execution environment is an open execution environment running in a mobile device, which provides open and rich operational capability support for application programs running therein but has relatively weak security protection capability. The trusted execution environment is an isolated execution environment running in a mobile device. Compared with the rich execution environment, it has stronger security capability to ensure that application programs running therein, sensitive data, and the like are stored, processed, and protected in a relatively trusted environment.

The execution environment can allow mobile applications to run or be installed therein, for example, may include at least a mobile application A and a mobile application B. In a mobile terminal installed with a secure element, the security of the mobile terminal device is improved by installing a security application in the secure element.

In the prior art, for a mobile terminal that provides a secure element, developers of various mobile applications need to install independent security applications in the secure element. For example, in a Huawei mobile phone, Taobao, Suning, and Jingdong need to install their own security applications in a secure element to improve the security of their mobile applications, which leads to unnecessary R&D expenditures and is not conducive to subsequent maintenance. Especially in the case where the same developer or associated developers develop a plurality of mobile applications, such as Taobao, Xianyu, Alipay, and other mobile applications, there is no separate development of several independent security applications at all in the case of having unified security requirements.

In order to solve the technical problem, it can be realized by sharing a security application in a mobile phone. The security application may be pre-configured in or downloaded later to a mobile phone of a user. The security application is used to manage keys of various mobile applications, and realize processing of service data, thereby realizing the use of one security application to provide security services for a plurality of mobile applications, thus realizing sharing of the security application.

For ease of description, the present application is illustrated by taking two mobile applications as an example. For example, a mobile application A is a Taobao mobile application, and a mobile application B is a Suning mobile application. It should be noted that a security application may be managed in the same manner for the various mobile applications. Communication security protection keys and service keys of the various mobile applications are securely isolated in the security application, and each mobile application, when requesting a service from the security application, can only access a communication security protection key and a service key corresponding to the mobile application.

Embodiment 1

A method of sharing a security application according to an embodiment of the present application is shown in FIG. 1, and includes the following steps:

In Step 105, mobile applications receive communication security protection keys of the mobile applications. The security communication protection keys may be generated by management servers of the mobile applications, or they may be generated by a management server of a security application and then synchronized to the management servers of the mobile applications. The mobile applications (e.g., a mobile application A and a mobile application B) may receive respective communication security protection keys (e.g., a communication security protection key of mobile application A and a communication security protection key of mobile application B) respectively from corresponding mobile application servers (e.g., a server of mobile application A and a server of mobile application B). The communication security protection keys may be symmetric keys or asymmetric keys. In the case where the communication security protection keys are symmetric keys, the communication security protection keys are mainly used to perform encryption or decryption on to-be-transmitted service data; in the case where the communication security protection keys are asymmetric keys, public keys in the communication security protection keys are mainly used to perform encryption on the to-be-transmitted service data and perform verification on returned signatures, and private keys in the communication security protection keys are mainly used to perform decryption on the received encrypted service data, perform processing by using the service keys, and sign the processed service data. Generally speaking, the public keys of the communication security protection keys may be stored in the mobile applications, and the private keys of the communication security protection keys may be stored in the security application.

In Step 110, the security application receives the communication security protection keys and the service keys of the mobile applications. As described above, the security communication protection keys may be generated by the management servers of the mobile applications, or they may be generated by the management server of the security application and then synchronized to the management servers of the mobile applications. In the case where the communication security protection keys of the mobile applications are generated by the management servers of the mobile applications, the management server of the security application may receive the communication security protection keys of the mobile applications, and then send them to the security application. The service keys of the mobile applications (e.g., mobile application A and mobile application B) are generated by the management servers of the mobile applications, and then the management servers of the mobile applications send the service keys of the mobile applications (e.g., the service key of mobile application A and the service key of mobile application B) to the management server of the security application. The security application may receive the communication security protection keys and the service keys of the mobile applications (e.g., the communication security protection key and service key of mobile application A and the communication security protection key and service key of mobile application B) from the management server of the security application. The security application may perform security isolation on the received communication security protection keys and/or service keys of the various mobile applications, for example, securely isolate the communication security protection key and service key of mobile application A from the communication security protection key and service key of mobile application B. The communication security protection keys and the service keys may be stored in different files; each file may store only one key, or each file may store a communication security protection key and a service key corresponding to a mobile application. By setting access permissions of the various mobile applications, the security isolation of the keys is realized. It should be noted that when the communication security protection keys adopt asymmetric keys, the various mobile applications may adopt the same public key as, and the security application may adopt a corresponding private key as the communication security protection keys. The mobile applications may have a plurality of service keys, for example, may have symmetric keys as service keys and may have asymmetric keys as service keys. Different service keys may be used for different services. For example, video services are processed by using the symmetric keys, and voice services are processed by using the asymmetric keys.

In Step 115, the mobile applications encrypt the service data by using the communication security protection keys of the mobile applications and send the encrypted service data to the security application. In the case where the mobile applications themselves have service data that needs to be decrypted, since the mobile applications themselves do not have service keys, the mobile applications need to request the security application to decrypt the service data. In order to improve the security, when the mobile applications request the security application to decrypt the service data, the service data may be encrypted by using the communication security protection keys of the mobile applications. Generally speaking, the communication security protection keys of the mobile applications adopt asymmetric keys. For example, the keys saved by the mobile applications are public keys, and the keys saved by the security application are private keys. The mobile applications (e.g., mobile application A and mobile application B) encrypt the service data by using their own public keys (e.g., the communication security protection public key of mobile application A and the communication security protection public key of mobile application B) and send the encrypted service data to the security application. An algorithm for the asymmetric keys may include any one of: Rivest_Shamir-Adleman (RSA), Elgamal, knapsack algorithm, Rabin, Diffie-Hellman (D-H), and elliptic-curve cryptography (ECC).

In Step 120, the security application performs decryption by using the communication security protection keys of the mobile applications to obtain the service data. The security application receives mobile communication security protection keys of the mobile applications (e.g., the communication security protection private key of mobile application A and the communication security protection private key of mobile application B) from the management server of the security application, so as to perform decryption on the received data by using the mobile communication security protection keys of the mobile applications to obtain the service data.

In Step 125, the security application processes the service data by using the service keys of the mobile applications. The security application may perform processing on the service data by using the service keys (e.g., the service key of mobile application A and the service key of mobile application B) stored therein. The service keys may be symmetric keys or asymmetric keys. An algorithm for the symmetric keys may include any one of: Data Encryption Standard (DES), Advanced Encryption Standard (AES), and MD5, and the algorithm for the asymmetric keys may include any one of RSA, Elgamal, knapsack algorithm, Rabin, D-H, and ECC. When asymmetric keys are used as the service keys, a processing method of the service data may be determined according to specific requirements. For example, if the service data needs to be encrypted, public keys of the service keys may be used for encryption. If the service data itself is encrypted data, then private keys of the service keys can be used for decryption. Moreover, the processing method may also include signing the service data or verifying signatures of the service data. For example, the service data itself is data containing signatures, the signatures may be verified by using the public keys of the service keys. If the service data needs to be signed, then the private keys of the service keys may be used for signing. When symmetric keys are used, if the service data needs to be encrypted, it may be encrypted by using the service keys; if the service data itself is encrypted data, then it may be decrypted by using the service keys. It is understood that there may be a plurality of groups of service keys. For example, for a plurality of groups of asymmetric keys, the security application may store public keys or private keys in different key pairs, and use corresponding keys according to specific service requirements.

In Step 130, the security application sends the processed service data to the mobile applications. After processing the service data, the security application may send the processed service data to the corresponding mobile applications, for example, send the processed service data of mobile application A to mobile application A, and send the processed service data of mobile application B to mobile application B; then, mobile application A and mobile application B may perform subsequent service processes based on the processed service data.

Optionally, when sending the processed service data to the mobile applications, the security application may also sign the processed service data by using the communication security protection keys of the mobile applications (e.g., the communication security protection private key of mobile application A and the communication security protection private key of mobile application B), thus further improving the security.

The above embodiment can realize the unified management of the communication security protection keys and the service keys of the several mobile applications by the security application, thereby realizing the sharing of the security application and avoiding installing a respective security application in the secure element for each mobile application.

It should be noted that if both the communication security protection keys and the service keys are generated by the management servers of the mobile applications, the order of the management servers of the mobile applications generating the communication security protection keys and the service keys is not limited. The communication security protection keys may be generated first, or the service keys may be generated first, or the communication security protection keys and the service keys may be generated at the same time. Similarly, when the communication security protection keys and the service keys are sent to the management server of the security application, there is no limit on the order. The communication security protection keys may be sent first, or the service keys may be sent first, or the communication security protection keys and the service keys may be sent at the same time.

It should be further noted that the communication security protection keys may not be generated by the management servers of the mobile applications or the management server of the security application, so the steps related to the security communication protection keys in the present embodiment can be omitted.

Embodiment 2

Figure 2:
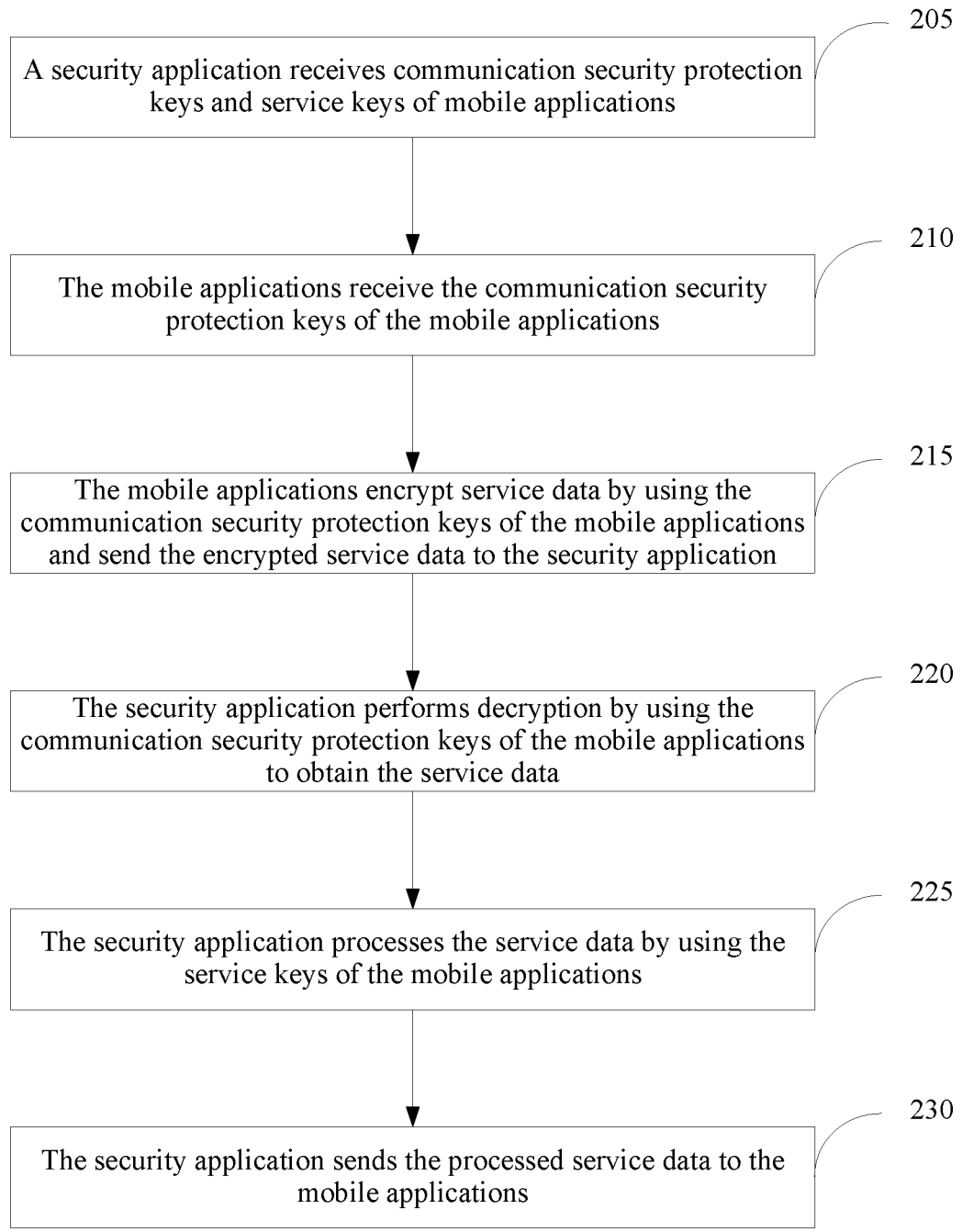
FIG. 2 is a schematic diagram of a method of sharing a security application according to Embodiment 2 of the present application.

A method of sharing a security application according to an embodiment of the present application is shown in FIG. 2, and includes the following steps:

In Step 205, a security application receives communication security protection keys and service keys of mobile applications. The security communication protection keys may be generated by management servers of the mobile applications, or they may be generated by a management server of the security application and then synchronized to the management servers of the mobile applications. In the case where the communication security protection keys of the mobile applications are generated by the management servers of the mobile applications, the management server of the security application may receive the communication security protection keys of the mobile applications, and then send them to the security application. The service keys of the mobile applications (e.g., a mobile application A and a mobile application B) are generated by the management servers of the mobile applications, and then the management servers of the mobile applications send the service keys of the mobile applications (e.g., the service key of mobile application A and the service key of mobile application B) to the management server of the security application. The security application may receive the communication security protection keys and the service keys of the mobile applications (e.g., the communication security protection key and service key of mobile application A and the communication security protection key and service key of mobile application B) from the management server of the security application. The communication security protection keys may be symmetric keys or asymmetric keys. In the case where the communication security protection keys are symmetric keys, the communication security protection keys are mainly used to perform encryption or decryption on to-be-transmitted service data. In the case where the communication security protection keys are asymmetric keys, public keys in the communication security protection keys are mainly used to perform encryption on the to-be-transmitted service data and perform verification on returned signatures, and private keys in the communication security protection keys are mainly used to perform decryption on the received encrypted service data, perform processing by using the service keys, and sign the processed service data. Generally speaking, the public keys of the communication security protection keys may be stored in the mobile applications, and the private keys of the communication security protection keys may be stored in the security application.

In Step 210, the mobile applications receive the communication security protection keys of the mobile applications. As described above, the security communication protection keys may be generated by the management servers of the mobile applications, or they may be generated by the management server of the security application and then synchronized to the management servers of the mobile applications. The mobile applications (e.g., mobile application A and mobile application B) may receive respective communication security protection keys (e.g., the communication security protection key of mobile application A and the communication security protection key of mobile application B) respectively from corresponding mobile application servers (e.g., a server of mobile application A and a server of mobile application B). It should be noted that when the communication security protection keys adopt asymmetric keys, the various mobile applications may adopt the same public key as, and the security application may adopt a corresponding private key as the communication security protection keys. The mobile applications may have a plurality of service keys, for example, may have symmetric keys as service keys and may also have asymmetric keys as service keys. Different service keys may be used for different services. For example, video services are processed by using the symmetric keys, and voice services are processed by using the asymmetric keys.

In Step 215, the mobile applications encrypt the service data by using the communication security protection keys of the mobile applications and send the encrypted service data to the security application. In the case where the mobile applications themselves have service data that needs to be decrypted, since the mobile applications themselves do not have service keys, the mobile applications need to request the security application to decrypt the service data. In order to improve the security, when the mobile applications request the security application to decrypt the service data, the service data may be encrypted by using the communication security protection keys of the mobile applications. Generally speaking, the communication security protection keys of the mobile applications adopt asymmetric keys. For example, the keys saved by the mobile applications are public keys, and the keys saved by the security application are private keys. The mobile applications (e.g., mobile application A and mobile application B) encrypt the service data by using their own public keys (e.g., the communication security protection public key of mobile application A and the communication security protection public key of mobile application B) and send the encrypted service data to the security application. The algorithm for the asymmetric keys may include any one of RSA, Elgamal, knapsack algorithm, Rabin, D-H, and ECC.

In Step 220, the security application performs decryption by using the communication security protection keys of the mobile applications to obtain the service data. The security application receives mobile communication security protection keys of the mobile applications (e.g., the communication security protection private key of mobile application A and the communication security protection private key of mobile application B) from the management server of the security application, so as to perform decryption on the received data by using the mobile communication security protection keys of the mobile applications to obtain the service data.

In Step 225, the security application processes the service data by using the service keys of the mobile applications. The security application may perform decryption on the service data by using the service keys (e.g., the service key of mobile application A and the service key of mobile application B) stored therein. The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC. When asymmetric keys are used as the service keys, a processing method of the service data may be determined according to specific requirements. For example, if the service data needs to be encrypted, public keys of the service keys may be used for encryption; if the service data itself is encrypted data, then private keys of the service keys can be used for decryption. Moreover, the processing method may also include signing the service data or verifying signatures of the service data. For example, if the service data itself is data containing signatures, then the signatures may be verified by using the public keys of the service keys; if the service data needs to be signed, it may be signed by using the private keys of the service keys. When symmetric keys are used, if the service data needs to be encrypted, it may be encrypted by using the service keys; if the service data itself is encrypted data, it may be decrypted by using the service keys.

In Step 230, the security application sends the processed service data to the mobile applications. After processing the service data, the security application may send the processed service data to the corresponding mobile applications, for example, send the processed service data of mobile application A to mobile application A, and send the processed service data of mobile application B to mobile application B; then, mobile application A and mobile application B may perform subsequent service processes based on the processed service data.

It should be noted that if both the communication security protection keys and the service keys are generated by the management servers of the mobile applications, the order of the management servers of the mobile applications generating the communication security protection keys and the service keys is not limited. The communication security protection keys may be generated first, or the service keys may be generated first, or the communication security protection keys and the service keys may be generated at the same time. Similarly, when the communication security protection keys and the service keys are sent to the management server of the security application, there is no limit on the order. The communication security protection keys may be sent first, or the service keys may be sent first, or the communication security protection keys and the service keys may be sent at the same time.

It should be further noted that the communication security protection keys may not be generated by the management servers of the mobile applications or the management server of the security application, so the steps related to the security communication protection key in the present embodiment can be omitted.

In addition, the security application may include a first security application and a second security application. A portion of the mobile applications communicates with the first security application, and the other portion of the mobile applications communicates with the second security application. Preferably, the mobile applications may also communicate with the security application through a security proxy.

Optionally, when sending the processed service data to the mobile applications, the security application may also sign the processed service data by using the communication security protection keys of the mobile applications (e.g., the communication security protection private key of mobile application A and the communication security protection private key of mobile application B), thus further improving the security.

The above embodiment can realize the unified management of the communication security protection keys and the service keys of the several mobile applications by the security application, thereby realizing the sharing of the security application and avoiding installing a respective security application in the secure element for each mobile application.

Embodiment 3

Figure 3:
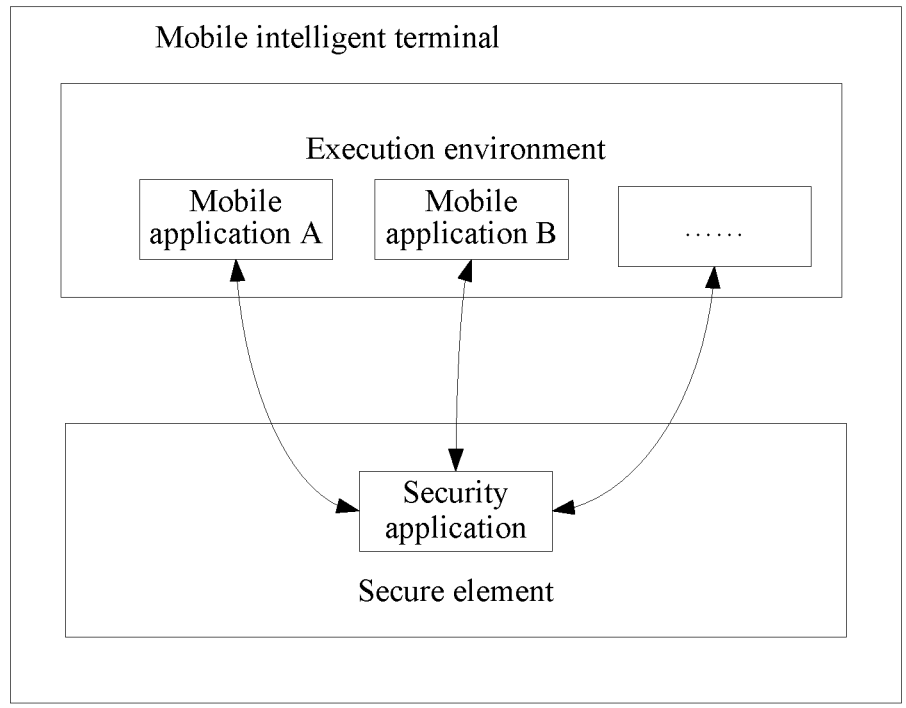
FIG. 3 is a schematic diagram of a mobile terminal according to Embodiment 3 of the present application.

FIG. 3 is a schematic diagram of a mobile terminal according to an embodiment of the present application, including an execution environment and a secure element. Applications such as a mobile application A and a mobile application B are installed or run in the execution environment, and a security application runs in the secure element.

The mobile applications (e.g., mobile application A and mobile application B) may receive security communication protection keys of the mobile applications (e.g., a security communication protection key of mobile application A and a security communication protection key of mobile application B) from management servers of the mobile applications. Generally speaking, the communication security protection keys of the mobile applications adopt asymmetric keys. For example, keys saved by the mobile applications are public keys, and keys saved by the security application are private keys. The algorithm for the asymmetric keys may include any one of RSA, Elgamal, knapsack algorithm, Rabin, D-H, and ECC.

In the case of having service data that needs to be processed (e.g., decrypted), the mobile applications (e.g., mobile application A and mobile application B) may encrypt the service data by using the communication security protection keys of the mobile applications (e.g., a communication security protection public key of mobile application A and a communication security protection public key of mobile application B), and send the encrypted service data to the security application. The security application may receive the communication security protection keys and service keys of the mobile applications (e.g., mobile application A and mobile application B) from a management server of the security application. As described above, the communication security protection keys of the mobile applications may be asymmetric keys, and therefore, the security application may decrypt, by using communication security protection private keys of the mobile applications (e.g., mobile application A and mobile application B), the service data sent by the mobile applications, then perform decryption by using the service keys of the mobile applications (e.g., mobile application A and mobile application B). The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC.

After decrypting the service data, the security application may send the decrypted data to the corresponding mobile applications (e.g., mobile application A and mobile application B) for the mobile applications to complete the subsequent processes.

Preferably, after decrypting the service data, the security application may also sign the decrypted service data by using the communication security protection private keys of the mobile applications (e.g., mobile application A and mobile application B) to improve the security. After receiving the signed decrypted service data, the mobile applications (e.g., mobile application A and mobile application B) verify the signatures by using the communication security protection public keys of the mobile applications, thereby obtaining the decrypted service data, and subsequent processes can be completed.

The mobile terminal in the above embodiment can realize installation of a security application in a secure element, provide security services for several mobile applications installed or running in an execution environment, and provide decryption services to service data of the mobile applications, thereby improving the security of the mobile terminal.

Embodiment 4

Figure 4:
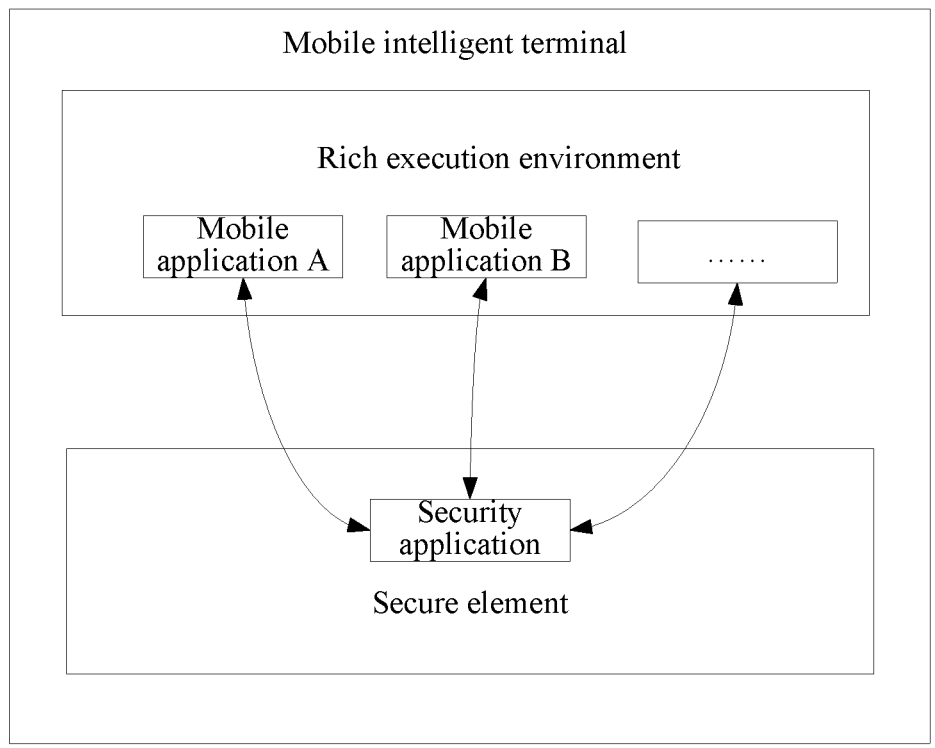
FIG. 4 is a schematic diagram of a mobile terminal according to Embodiment 4 of the present application.

FIG. 4 is a schematic diagram of a mobile terminal according to an embodiment of the present application, including a rich execution environment and a secure element. Applications such as a mobile application A and a mobile application B are installed or run in the rich execution environment, and a security application runs in the secure element. The rich execution environment is an open execution environment running in a mobile device, which provides open and rich operational capability support for application programs running therein but has relatively weak security protection capability.

The mobile applications (e.g., mobile application A and mobile application B in the rich execution environment) may receive security communication protection keys of the mobile applications (e.g., a security communication protection key of mobile application A and a security communication protection key of mobile application B in the rich execution environment) from management servers of the mobile applications. Generally speaking, the communication security protection keys of the mobile applications adopt asymmetric keys. For example, keys saved by the mobile applications are public keys, and keys saved by the security application are private keys. The algorithm for the asymmetric keys may include any one of RSA, Elgamal, knapsack algorithm, Rabin, D-H, and ECC.

In the case of having service data that needs to be processed (e.g., decrypted), the mobile applications (e.g., mobile application A and mobile application B in the rich execution environment) may encrypt the service data by using the communication security protection keys of the mobile applications (e.g., a communication security protection public key of mobile application A and a communication security protection public key of mobile application B in the rich execution environment), and send the encrypted service data to the security application. The security application may receive the communication security protection keys and service keys of the mobile applications (e.g., mobile application A and mobile application B in the rich execution environment) from a management server of the security application. As described above, the communication security protection keys of the mobile applications may be asymmetric keys, and therefore, the security application may decrypt, by using communication security protection private keys of the mobile applications (e.g., mobile application A and mobile application B in the rich execution environment), the service data sent by the mobile applications, then perform decryption by using the service keys of the mobile applications (e.g., mobile application A and mobile application B in the rich execution environment). The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC.

After decrypting the service data, the security application may send the decrypted data to the corresponding mobile applications (e.g., mobile application A and mobile application B in the rich execution environment) for the mobile applications to complete the subsequent processes.

Preferably, after decrypting the service data, the security application may also sign the decrypted service data by using the communication security protection private keys of the mobile applications (e.g., mobile application A and mobile application B in the rich execution environment) to improve the security. After receiving the encrypted service data, the mobile applications (e.g., mobile application A and mobile application B in the rich execution environment) verify signatures by using the communication security protection public keys of the mobile applications, thereby obtaining the decrypted service data, and subsequent processes can be completed.

The mobile terminal in the above embodiment can realize installation of a security application in a secure element, provide security services for several mobile applications installed or running in an execution environment, and provide decryption services for service data of the mobile applications, thereby improving the security of the mobile terminal.

Embodiment 5

Figure 5:
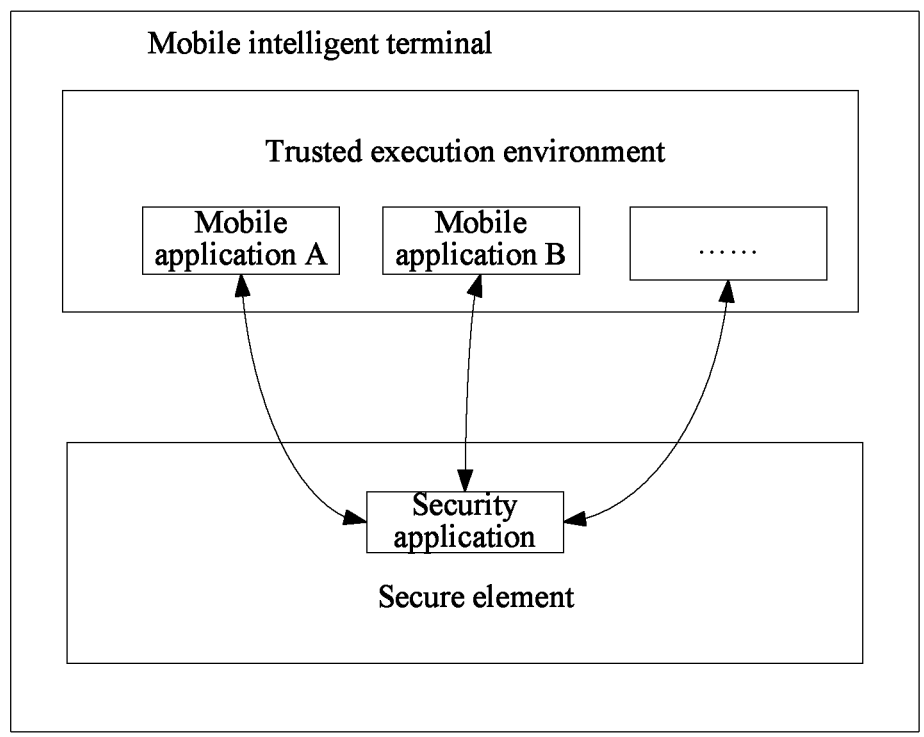
FIG. 5 is a schematic diagram of a mobile terminal according to Embodiment 5 of the present application.

FIG. 5 is a schematic diagram of a mobile terminal according to an embodiment of the present application, including a trusted execution environment and a secure element. Applications such as a mobile application A and a mobile application B are installed or run in the trusted execution environment, and a security application runs in the secure element. The trusted execution environment is an isolated execution environment running in a mobile device. Compared with the rich execution environment, it has stronger security capability to ensure that application programs running therein, sensitive data, and the like are stored, processed, and protected in a relatively trusted environment.

The mobile applications (e.g., mobile application A and mobile application B in the trusted execution environment) may receive security communication protection keys of the mobile applications (e.g., a security communication protection key of mobile application A and a security communication protection key of mobile application B in the trusted execution environment) from management servers of the mobile applications. Generally speaking, the communication security protection keys of the mobile applications adopt asymmetric keys. For example, keys saved by the mobile applications are public keys, and keys saved by the security application are private keys. The algorithm for the asymmetric keys may include any one of RSA, Elgamal, knapsack algorithm, Rabin, D-H, and ECC.

In the case of having service data that needs to be processed (e.g., decrypted), the mobile applications (e.g., mobile application A and mobile application B in the trusted execution environment) may encrypt the service data by using the communication security protection keys of the mobile applications (e.g., a communication security protection public key of mobile application A and a communication security protection public key of mobile application B in the trusted execution environment), and send the encrypted service data to the security application. The security application may receive the communication security protection keys and service keys of the mobile applications (e.g., mobile application A and mobile application B in the trusted execution environment) from a management server of the security application. As described above, the communication security protection keys of the mobile applications may be asymmetric keys, and therefore, the security application may decrypt, by using communication security protection private keys of the mobile applications (e.g., mobile application A and mobile application B in the trusted execution environment), the service data sent by the mobile applications, and then perform decryption by using the service keys of the mobile applications (e.g., mobile application A and mobile application B in the trusted execution environment). The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC.

After decrypting the service data, the security application may send the decrypted data to the corresponding mobile applications (e.g., mobile application A and mobile application B in the trusted execution environment) for the mobile applications to complete the subsequent processes.

Preferably, after decrypting the service data, the security application may also sign the decrypted service data by using the communication security protection private keys of the mobile applications (e.g., mobile application A and mobile application B in the trusted execution environment) to improve the security. After receiving the signed service data, the mobile applications (e.g., mobile application A and mobile application B in the trusted execution environment) verify signatures by using the communication security protection public keys of the mobile applications, thereby obtaining the decrypted service data, and subsequent processes can be completed.

The mobile terminal in the above embodiment can realize installation of a security application in a secure element, provide security services for several mobile applications installed or running in an execution environment, and provide decryption services for service data of the mobile applications, thereby improving the security of the mobile terminal.

Embodiment 6

Figure 6:
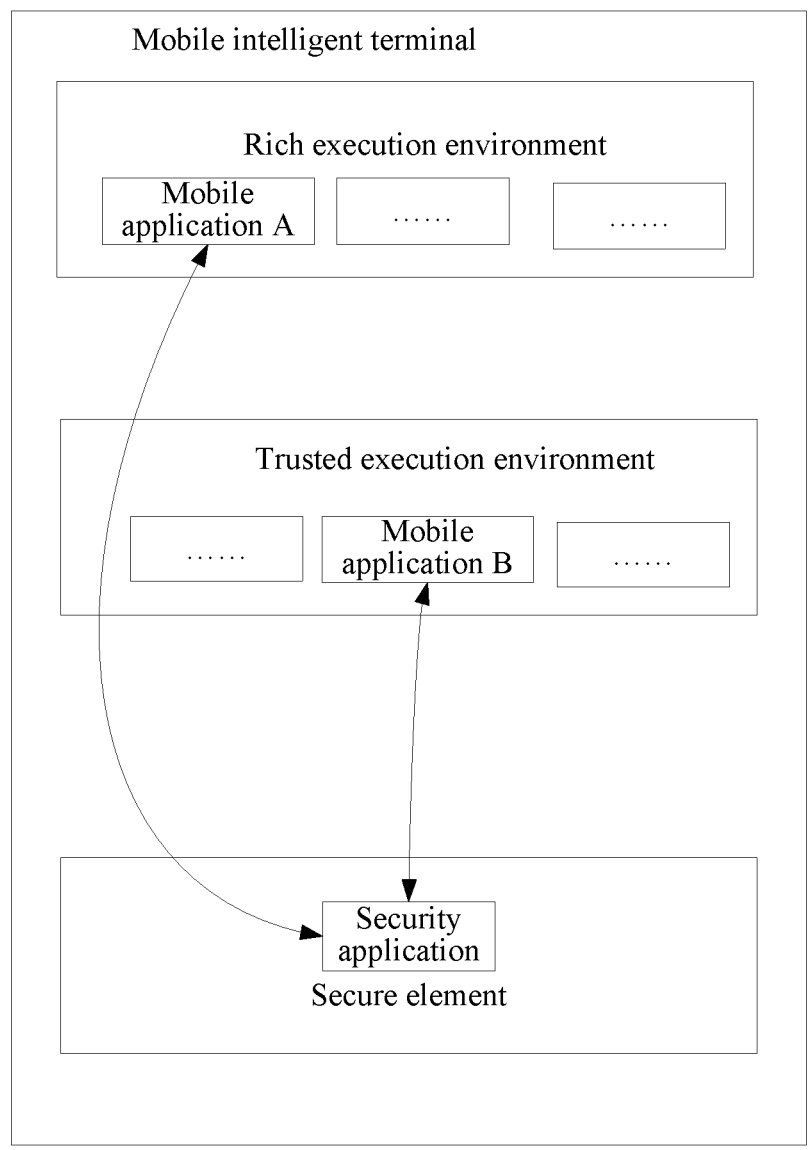
FIG. 6 is a schematic diagram of a mobile terminal according to Embodiment 6 of the present application.

FIG. 6 is a schematic diagram of a mobile terminal according to an embodiment of the present application, including a rich execution environment, a trusted execution environment, and a secure element. Applications such as a mobile application A are installed or run in the rich execution environment, applications such as a mobile application B are installed or run in the trusted execution environment, and a security application runs in the secure element. The rich execution environment is an open execution environment running in a mobile device, which provides open and rich operational capability support for application programs running therein, but has relatively weak security protection capability. The trusted execution environment is an isolated execution environment running in a mobile device. Compared with the rich execution environment, it has stronger security capability to ensure that application programs running therein, sensitive data, and the like are stored, processed, and protected in a relatively trusted environment.

The mobile applications (e.g., mobile application A in the rich execution environment and mobile application B in the trusted execution environment) may receive security communication protection keys of the mobile applications (e.g., a security communication protection key of mobile application A in the rich execution environment and a security communication protection key of mobile application B in the trusted execution environment) from management servers of the mobile applications. Generally speaking, the communication security protection keys of the mobile applications adopt asymmetric keys. For example, keys saved by the mobile applications are public keys, and keys saved by the security application are private keys. The algorithm for the asymmetric keys may include any one of RSA, Elgamal, knapsack algorithm, Rabin, D-H, and ECC.

In the case of having service data that needs to be processed (e.g., decrypted), the mobile applications (e.g., mobile application A in the rich execution environment and mobile application B in the trusted execution environment) may encrypt the service data by using the communication security protection keys of the mobile applications (e.g., a communication security protection public key of mobile application A in the rich execution environment and a communication security protection public key of mobile application B in the trusted execution environment), and send the encrypted service data to the security application. The security application may receive the communication security protection keys and service keys of the mobile applications (e.g., mobile application A in the rich execution environment and mobile application B in the trusted execution environment) from a management server of the security application. As described above, the communication security protection keys of the mobile applications may be asymmetric keys, and therefore, the security application may decrypt, by using communication security protection private keys of the mobile applications (e.g., mobile application A in the rich execution environment and mobile application B in the trusted execution environment), the service data sent by the mobile applications, then perform decryption by using the service keys of the mobile applications (e.g., mobile application A in the rich execution environment and mobile application B in the trusted execution environment). The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC.

After decrypting the service data, the security application may send the decrypted data to the corresponding mobile applications (e.g., mobile application A in the rich execution environment and mobile application B in the trusted execution environment) for the mobile applications to complete the subsequent processes.

Preferably, after decrypting the service data, the security application may also sign the decrypted service data by using the communication security protection private keys of the mobile applications (e.g., mobile application A in the rich execution environment and mobile application B in the trusted execution environment) to improve the security. After receiving the signed service data, the mobile applications (e.g., mobile application A in the rich execution environment and mobile application B in the trusted execution environment) verify the signatures by using the communication security protection public keys of the mobile applications, thereby obtaining the decrypted service data, and subsequent processes can be completed.

The mobile terminal in the above embodiment can realize installation of a security application in a secure element, provide security services for several mobile applications installed or running in an execution environment, and provide decryption services for service data of the mobile applications, thereby improving the security of the mobile terminal.

Embodiment 7

Figure 7:
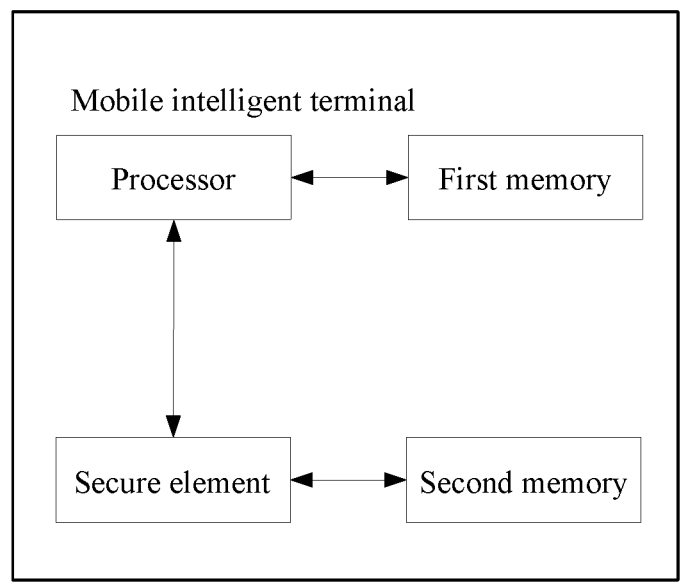
FIG. 7 is a schematic diagram of a mobile terminal according to Embodiment 7 of the present application.

FIG. 7 is a schematic diagram of a mobile terminal according to an embodiment of the present application, including a processor and a first memory, as well as a secure element and a second memory. The first memory stores programs corresponding to mobile applications (e.g., a program A corresponding to the mobile applications and a program B corresponding to the mobile applications) and other programs, and the second memory stores a program corresponding to a security application.

The processor may execute the programs corresponding to the mobile applications (e.g., program A corresponding to the mobile applications and program B corresponding to the mobile applications), so as to receive security communication protection keys of the mobile applications from management servers of the programs corresponding to the mobile applications. Generally speaking, the communication security protection keys of the mobile applications adopt asymmetric keys. For example, keys saved by the mobile applications are public keys, and keys saved by the security application are private keys. The algorithm for the asymmetric keys may include any one of RSA, Elgamal, knapsack algorithm, Rabin, D-H, and ECC.

In the case of having service data that needs to be processed (e.g., decrypted), the programs corresponding to the mobile applications (e.g., program A corresponding to the mobile applications and program B corresponding to the mobile applications) may encrypt the service data by using the communication security protection keys of the mobile applications, and send the encrypted service data to the secure element. The secure element may execute the program corresponding to the security application, so that the communication security protection keys and service keys of the mobile applications can be received from the management server of the program corresponding to the security application. As described above, the communication security protection keys of the mobile applications may be asymmetric keys, and therefore, the secure element may decrypt, by using communication security protection private keys of the mobile applications, the service data sent by the processor, and then perform decryption by using the service keys of the mobile applications. The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC.

After decrypting the service data, the secure element may send the decrypted data to the processor for the processor to complete the subsequent processes.

Preferably, after decrypting the service data, the processor may also sign the decrypted service data by using the communication security protection private keys of the mobile applications to improve the security. After receiving the signed service data, the processor verifies the signatures by using communication security protection public keys of the mobile applications, thereby obtaining the decrypted service data, and subsequent processes can be completed.

The mobile terminal in the above embodiment can realize installation of a program corresponding to a security application in a secure element, provide security services for a plurality of mobile applications installed or running in an execution environment, and provide decryption services for service data of the mobile applications, thereby improving the security of the mobile terminal.

Embodiment 8

Figure 8:
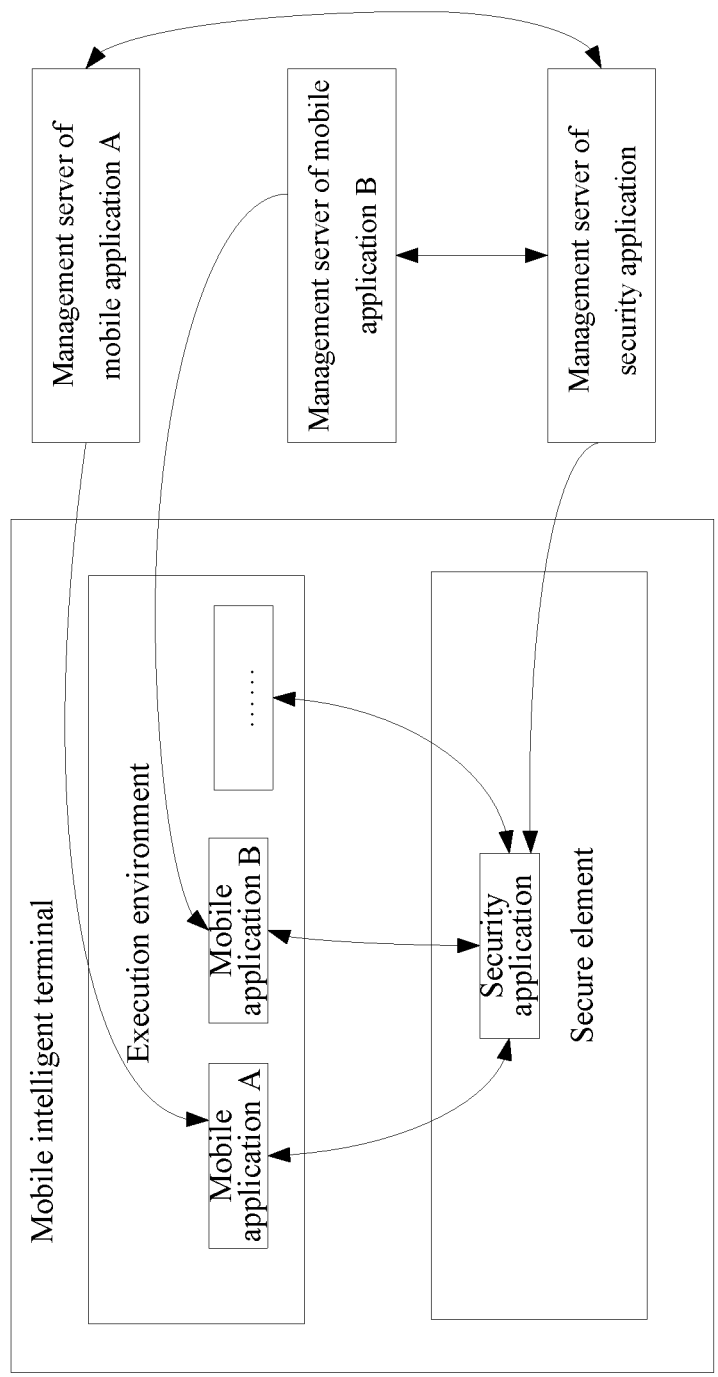
FIG. 8 is a schematic diagram of a system of sharing a security application according to Embodiment 8 of the present application.

As shown in FIG. 8, a system of sharing a security application according to an embodiment of the present application includes a mobile terminal, management servers of mobile applications, and a management server of a security application. The mobile terminal includes an execution environment and a secure element. The management servers of the mobile applications may generate communication security protection keys and service keys of the mobile applications (e.g., a mobile application A and a mobile application B), and the management servers of the mobile applications may send the communication security protection keys and the service keys of the mobile applications (e.g., mobile application A and mobile application B) to the management server of the security application, and send the communication security protection keys of the mobile applications (e.g., mobile application A and mobile application B) to the corresponding mobile applications (e.g., mobile application A and mobile application B). The management server of the security application may send the communication security protection keys and the service keys of the mobile applications (e.g., mobile application A and mobile application B) to the security application. After receiving the communication security protection keys and the service keys of the mobile applications (e.g., mobile application A and mobile application B), the security application will perform secure isolation on the communication security protection keys and the service keys of the mobile applications. For example, the communication security protection key and service key of mobile application A are securely isolated from the communication security protection key and/or service key of mobile application B. It should be noted that if the communication security protection keys are provided by the management server of the security application, the various mobile applications may save the same public key, and the security application saves a corresponding private key. If the communication security protection keys are provided by the management servers of the mobile applications, the various mobile applications have different public keys, and the security application stores private keys corresponding to the plurality of corresponding public keys. Or, if the communication security protection keys are provided by the management servers of the mobile applications, in the case of using symmetric keys, the various mobile applications save their own keys, and the security application saves corresponding keys. In the security application, the various communication security protection keys need to be securely isolated. The service keys corresponding to the various mobile applications are generally different, and the various service keys also need to be isolated.

Optionally, the communication security protection keys of the mobile applications (e.g., mobile application A and mobile application B) may also be generated by the management server of the security application. The management server of the security application may send the generated communication security protection keys of the mobile applications (e.g., mobile application A and mobile application B) to the management servers of the mobile applications (e.g., mobile application A and mobile application B). In this case, the management servers of the mobile applications (e.g., mobile application A and mobile application B) may only generate the service keys of the mobile applications (e.g., mobile application A and mobile application B), and send the generated service keys of the mobile applications (e.g., mobile application A and mobile application B) to the management server of the security application. The management server of the security application may send the communication security protection keys and the service keys of the mobile applications (e.g., mobile application A and mobile application B) to the security application, and the management servers of the mobile applications (e.g., mobile application A and mobile application B) may send the communication security protection keys of the mobile applications (e.g., mobile application A and mobile application B) to the corresponding mobile applications (e.g., mobile application A and mobile application B).

Generally speaking, the communication security protection keys of the mobile applications adopt asymmetric keys. For example, keys saved by the mobile applications are public keys, and keys saved by the security application are private keys. The algorithm for the asymmetric keys may include any one of RSA, Elgamal, knapsack algorithm, Rabin, D-H, and ECC.

When initiating service operation requests such as decryption operation requests, the mobile applications (e.g., mobile application A and mobile application B) may encrypt service data by using the communication security protection public keys saved by the mobile applications (e.g., mobile application A and mobile application B), and send the encrypted service data to the security application. Optionally, the mobile applications may also initiate encryption operation requests, requesting the security application to encrypt the service data. In the case of using asymmetric keys as the service keys, signature requesting or signature verification operation requests may further be initiated.

After receiving the service data encrypted by the mobile applications (e.g., mobile application A and mobile application B) by using the communication security protection public keys of the mobile applications (e.g., mobile application A and mobile application B), the security application may perform decryption by using the communication security protection private keys of the mobile applications (e.g., mobile application A and mobile application B) to obtain the service data. Subsequently, the security application may decrypt the service data by using the service keys of the mobile applications (e.g., mobile application A and mobile application B) and may send the decrypted service data to the mobile applications (e.g., mobile application A and mobile application B), and the mobile applications may then use the decrypted service data to complete subsequent service processes. The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC.

Optionally, after decrypting the service data by using the service keys of the mobile applications (e.g., mobile application A and mobile application B), the security application may also sign the decrypted service data by using the communication security protection private keys of the mobile applications (e.g., mobile application A and mobile application B), and send the signed decrypted service data to the mobile applications (e.g., mobile application A and mobile application B). The mobile applications (e.g., mobile application A and mobile application B) may verify the signatures by using the corresponding communication security protection public keys to obtain the decrypted service data.

The above system can complete distribution of communication security protection keys and service keys, so that sharing one security application by several mobile applications can be realized.

Embodiment 9

Figure 9:
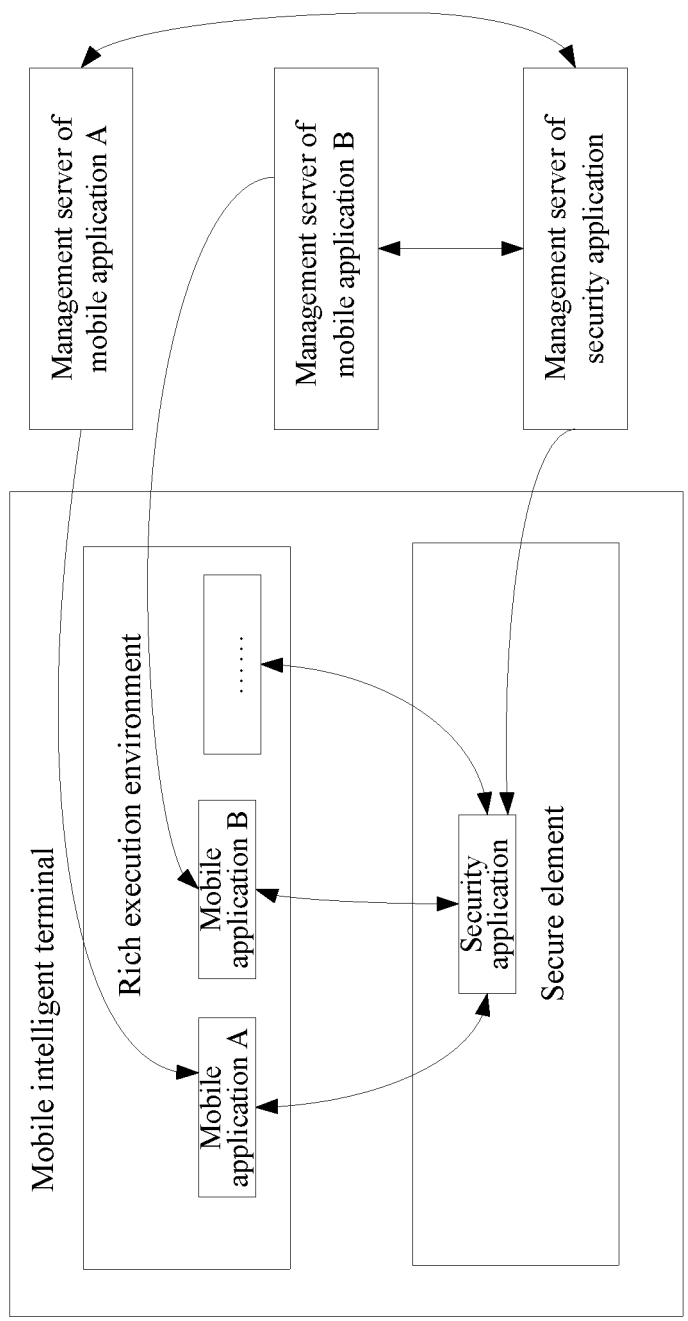
FIG. 9 is a schematic diagram of a system of sharing a security application according to Embodiment 9 of the present application.

As shown in FIG. 9, a system of sharing a security application according to an embodiment of the present application includes a mobile terminal, management servers of mobile applications, and a management server of a security application. The mobile terminal includes a rich execution environment and a secure element. The rich execution environment is an open execution environment running in a mobile device, which provides open and rich operational capability support for application programs running therein, but has relatively weak security protection capability.

The management servers of the mobile applications may generate communication security protection keys and service keys of the mobile applications (e.g., a mobile application A and a mobile application B in the rich execution environment), and the management servers of the mobile applications may send the communication security protection keys and the service keys of the mobile applications (e.g., mobile application A and mobile application B in the rich execution environment) to the management server of the security application, and send the communication security protection keys of the mobile applications (e.g., mobile application A and mobile application B in the rich execution environment) to the corresponding mobile applications (e.g., mobile application A and mobile application B in the rich execution environment). The management server of the security application may send the communication security protection keys and the service keys of the mobile applications (e.g., mobile application A and mobile application B in the rich execution environment) to the security application. After receiving the communication security protection keys and the service keys of the mobile applications (e.g., mobile application A and mobile application B in the rich execution environment), the security application will perform secure isolation on the communication security protection keys and the service keys of the mobile applications. For example, the communication security protection key and service key of mobile application A are securely isolated from the communication security protection key and service key of mobile application B. It should be noted that if the communication security protection keys are provided by the management server of the security application, the various mobile applications may save the same public key, and the security application saves a corresponding private key. If the communication security protection keys are provided by the management servers of the mobile applications, the various mobile applications have different public keys, and the security application stores private keys corresponding to the plurality of corresponding public keys. Or, if the communication security protection keys are provided by the management servers of the mobile applications, in the case of using symmetric keys, the various mobile applications save their own keys, and the security application saves corresponding keys. In the security application, the various communication security protection keys need to be securely isolated. The service keys corresponding to the various mobile applications are generally different, and the various service keys also need to be isolated.

Optionally, the communication security protection keys of the mobile applications (e.g., mobile application A and mobile application B in the rich execution environment) may also be generated by the management server of the security application. The management server of the security application may send the generated communication security protection keys of the mobile applications (e.g., mobile application A and mobile application B in the rich execution environment) to the management servers of the mobile applications (e.g., mobile application A and mobile application B in the rich execution environment). In this case, the management servers of the mobile applications (e.g., mobile application A and mobile application B in the rich execution environment) may only generate the service keys of the mobile applications (e.g., mobile application A and mobile application B in the rich execution environment), and send the generated service keys of the mobile applications (e.g., mobile application A and mobile application B in the rich execution environment) to the management server of the security application. The management server of the security application may send the communication security protection keys and the service keys of the mobile applications (e.g., mobile application A and mobile application B in the rich execution environment) to the security application, and the management servers of the mobile applications (e.g., mobile application A and mobile application B in the rich execution environment) may send the communication security protection keys of the mobile applications (e.g., mobile application A and mobile application B in the rich execution environment) to the corresponding mobile applications (e.g., mobile application A and mobile application B in the rich execution environment).

Generally speaking, the communication security protection keys of the mobile applications adopt asymmetric keys. For example, keys saved by the mobile applications are public keys, and keys saved by the security application are private keys. The algorithm for the asymmetric keys may include any one of RSA, Elgamal, knapsack algorithm, Rabin, D-H, and ECC.

When initiating service operation requests such as decryption operation requests, the mobile applications (e.g., mobile application A and mobile application B in the rich execution environment) may encrypt service data by using the communication security protection public keys saved by the mobile applications (e.g., mobile application A and mobile application B in the rich execution environment), and send the encrypted service data to the security application. Optionally, the mobile applications may also initiate encryption operation requests, requesting the security application to encrypt the service data. In the case of using asymmetric keys as the service keys, signature requesting or signature verification operation requests may further be initiated.

After receiving the service data encrypted by the mobile applications (e.g., mobile application A and mobile application B in the rich execution environment) by using the communication security protection public keys of the mobile applications (e.g., mobile application A and mobile application B in the rich execution environment), the security application may perform decryption by using the communication security protection private keys of the mobile applications (e.g., mobile application A and mobile application B in the rich execution environment) to obtain the service data. Subsequently, the security application may decrypt the service data by using the service keys of the mobile applications (e.g., mobile application A and mobile application B in the rich execution environment), and may send the decrypted service data to the mobile applications (e.g., mobile application A and mobile application B in the rich execution environment). The mobile applications may then use the decrypted service data to complete subsequent service processes. The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC.

Optionally, after decrypting the service data by using the service keys of the mobile applications (e.g., mobile application A and mobile application B in the rich execution environment), the security application may also sign the decrypted service data by using the communication security protection private keys of the mobile applications (e.g., mobile application A and mobile application B in the rich execution environment), and send the signed decrypted service data to the mobile applications (e.g., mobile application A and mobile application B in the rich execution environment). The mobile applications (e.g., mobile application A and mobile application B in the rich execution environment) may verify the signatures by using the corresponding communication security protection public keys to obtain the decrypted service data.

The above system can complete distribution of communication security protection keys and service keys, so that several mobile applications in the rich execution environment sharing one security application can be realized.

Embodiment 10

Figure 10:
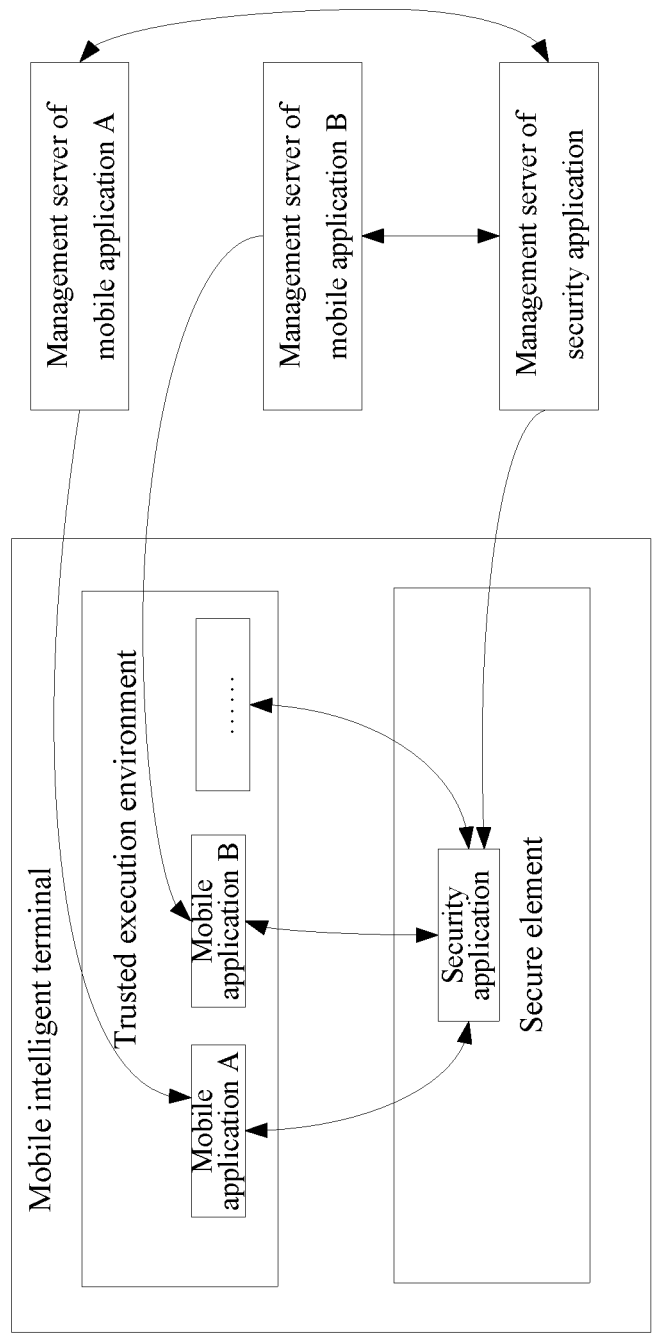
FIG. 10 is a schematic diagram of a system of sharing a security application according to Embodiment 10 of the present application.

As shown in FIG. 10, a system of sharing a security application according to an embodiment of the present application includes a mobile terminal, management servers of mobile applications, and a management server of a security application. The mobile terminal includes a trusted execution environment and a secure element. The trusted execution environment is an isolated execution environment running in a mobile device. Compared with the rich execution environment, it has stronger security capability to ensure that application programs running therein, sensitive data, and the like are stored, processed, and protected in a relatively trusted environment.

The management servers of the mobile applications may generate communication security protection keys and service keys of the mobile applications (e.g., a mobile application A and a mobile application B in the trusted execution environment), and the management servers of the mobile applications may send the communication security protection keys and the service keys of the mobile applications (e.g., mobile application A and mobile application B in the trusted execution environment) to the management server of the security application, and send the communication security protection keys of the mobile applications (e.g., mobile application A and mobile application B in the trusted execution environment) to the corresponding mobile applications (e.g., mobile application A and mobile application B in the trusted execution environment). The management server of the security application may send the communication security protection keys and the service keys of the mobile applications (e.g., mobile application A and mobile application B in the trusted execution environment) to the security application. After receiving the communication security protection keys and the service keys of the mobile applications (e.g., mobile application A and mobile application B in the trusted execution environment), the security application will perform secure isolation on the communication security protection keys and the service keys of the mobile applications. For example, the communication security protection key and service key of mobile application A are securely isolated from the communication security protection key and service key of mobile application B. It should be noted that if the communication security protection keys are provided by the management server of the security application, the various mobile applications may save the same public key, and the security application saves a corresponding private key. If the communication security protection keys are provided by the management servers of the mobile applications, the various mobile applications have different public keys, and the security application stores private keys corresponding to the plurality of corresponding public keys. Or, if the communication security protection keys are provided by the management servers of the mobile applications, in the case of using symmetric keys, the various mobile applications save their own keys, and the security application saves corresponding keys. In the security application, the various communication security protection keys need to be securely isolated. The service keys corresponding to the various mobile applications are generally different, and the various service keys also need to be isolated.

Optionally, the communication security protection keys of the mobile applications (e.g., mobile application A and mobile application B in the trusted execution environment) may also be generated by the management server of the security application. The management server of the security application may send the generated communication security protection keys of the mobile applications (e.g., mobile application A and mobile application B in the trusted execution environment) to the management servers of the mobile applications (e.g., mobile application A and mobile application B in the trusted execution environment). In this case, the management servers of the mobile applications (e.g., mobile application A and mobile application B in the trusted execution environment) may only generate the service keys of the mobile applications (e.g., mobile application A and mobile application B in the trusted execution environment), and send the generated service keys of the mobile applications (e.g., mobile application A and mobile application B in the trusted execution environment) to the management server of the security application. The management server of the security application may send the communication security protection keys and the service keys of the mobile applications (e.g., mobile application A and mobile application B in the trusted execution environment) to the security application, and the management servers of the mobile applications (e.g., mobile application A and mobile application B in the trusted execution environment) may send the communication security protection keys of the mobile applications (e.g., mobile application A and mobile application B in the trusted execution environment) to the corresponding mobile applications (e.g., mobile application A and mobile application B in the trusted execution environment).

Generally speaking, the communication security protection keys of the mobile applications adopt asymmetric keys. For example, keys saved by the mobile applications are public keys, and keys saved by the security application are private keys. The algorithm for the asymmetric keys may include any one of RSA, Elgamal, knapsack algorithm, Rabin, D-H, and ECC.

When initiating service operation requests such as decryption operation requests, the mobile applications (e.g., mobile application A and mobile application B in the trusted execution environment) may encrypt service data by using the communication security protection public keys saved by the mobile applications (e.g., mobile application A and mobile application B in the trusted execution environment), and send the encrypted service data to the security application.

After receiving the service data encrypted by the mobile applications (e.g., mobile application A and mobile application B in the trusted execution environment) by using the communication security protection public keys of the mobile applications (e.g., mobile application A and mobile application B in the trusted execution environment), the security application may perform decryption by using the communication security protection private keys of the mobile applications (e.g., mobile application A and mobile application B in the trusted execution environment) to obtain the service data. Subsequently, the security application may decrypt the service data by using the service keys of the mobile applications (e.g., mobile application A and mobile application B in the trusted execution environment), and may send the decrypted service data to the mobile applications (e.g., mobile application A and mobile application B in the trusted execution environment). The mobile applications may then use the decrypted service data to complete subsequent service processes. The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC.

Optionally, after decrypting the service data by using the service keys of the mobile applications (e.g., mobile application A and mobile application B in the trusted execution environment), the security application may also sign the decrypted service data by using the communication security protection private keys of the mobile applications (e.g., mobile application A and mobile application B in the trusted execution environment), and send the signed decrypted service data to the mobile applications (e.g., mobile application A and mobile application B in the trusted execution environment). The mobile applications (e.g., mobile application A and mobile application B in the trusted execution environment) may verify the signatures by using the corresponding communication security protection public keys to obtain the decrypted service data.

The above system can complete distribution of communication security protection keys and service keys, so that several mobile applications in the trusted execution environment sharing one security application can be realized.

Embodiment 11

Figure 11:
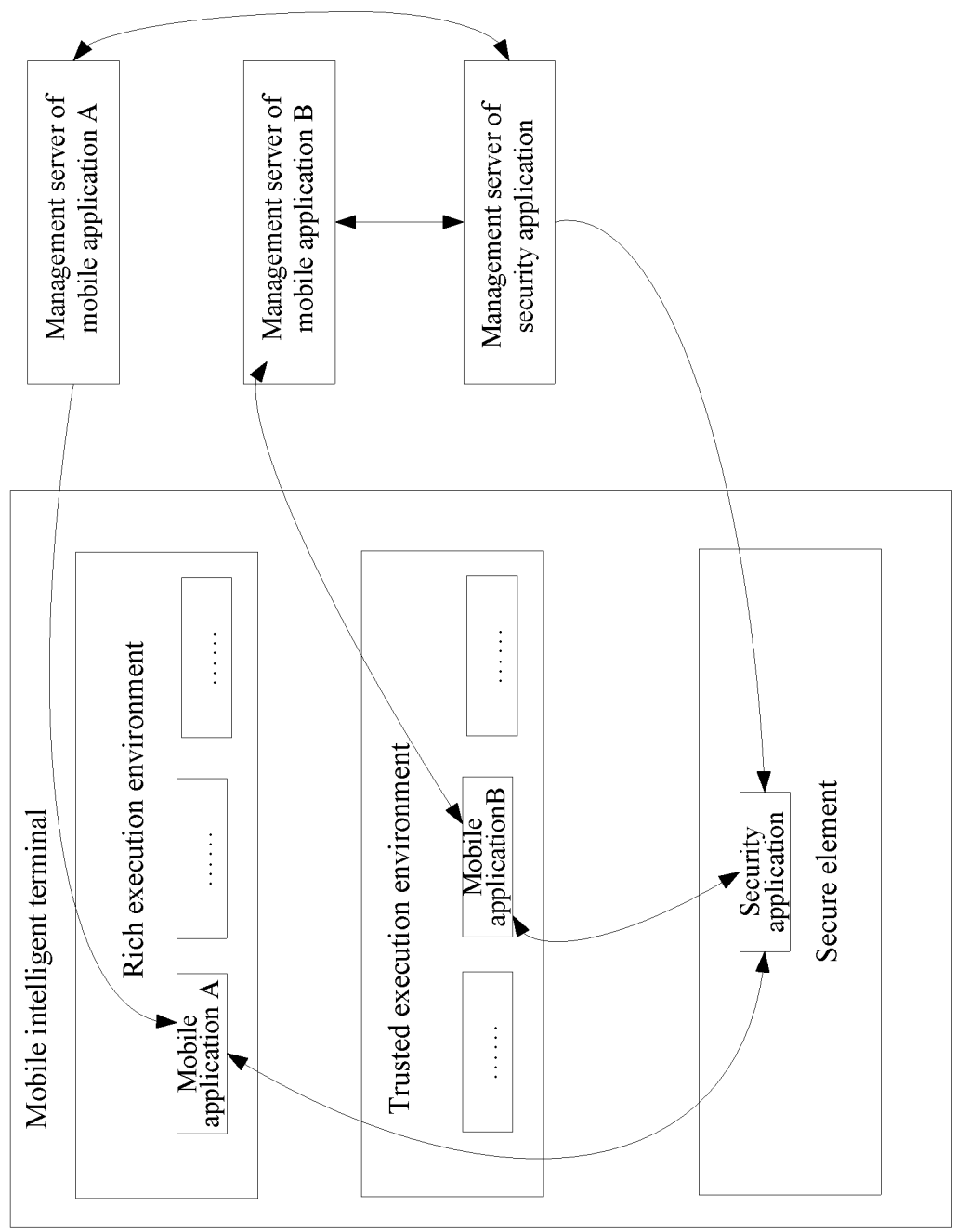
FIG. 11 is a schematic diagram of a system of sharing a security application according to Embodiment 11 of the present application.

As shown in FIG. 11, a system of sharing a security application according to an embodiment of the present application includes a mobile terminal, management servers of mobile applications, and a management server of a security application. The mobile terminal includes a rich execution environment, a trusted execution environment, and a secure element. The rich execution environment is an open execution environment running in a mobile device, which provides open and rich operational capability support for application programs running therein, but has relatively weak security protection capability. The trusted execution environment is an isolated execution environment running in a mobile device. Compared with the rich execution environment, it has stronger security capability to ensure that application programs running therein, sensitive data, and the like are stored, processed, and protected in a relatively trusted environment.

The management servers of the mobile applications may generate communication security protection keys and service keys of the mobile applications (e.g., a mobile application A in the rich execution environment and a mobile application B in the trusted execution environment), and the management servers of the mobile applications may send the communication security protection keys and the service keys of the mobile applications (e.g., mobile application A in the rich execution environment and mobile application B in the trusted execution environment) to the management server of the security application, and send the communication security protection keys of the mobile applications (e.g., mobile application A in the rich execution environment and mobile application B in the trusted execution environment) to the corresponding mobile applications (e.g., mobile application A in the rich execution environment and mobile application B in the trusted execution environment). The management server of the security application may send the communication security protection keys and the service keys of the mobile applications (e.g., mobile application A in the rich execution environment and mobile application B in the trusted execution environment) to the security application. After receiving the communication security protection keys and the service keys of the mobile applications (e.g., mobile application A in the rich execution environment and mobile application B in the trusted execution environment), the security application will perform secure isolation on the communication security protection keys and the service keys of the mobile applications. For example, the communication security protection key and service key of mobile application A are securely isolated from the communication security protection key and service key of mobile application B. It should be noted that if the communication security protection keys are provided by the management server of the security application, the various mobile applications may save the same public key, and the security application saves a corresponding private key. If the communication security protection keys are provided by the management servers of the mobile applications, the various mobile applications have different public keys, and the security application stores private keys corresponding to the plurality of corresponding public keys. Or, if the communication security protection keys are provided by the management servers of the mobile applications, in the case of using symmetric keys, the various mobile applications save their own keys, and the security application saves corresponding keys. In the security application, the various communication security protection keys need to be securely isolated. The service keys corresponding to the various mobile applications are generally different, and the various service keys also need to be isolated.

Optionally, the communication security protection keys of the mobile applications (e.g., mobile application A in the rich execution environment and mobile application B in the trusted execution environment) may also be generated by the management server of the security application. The management server of the security application may send the generated communication security protection keys of the mobile applications (e.g., mobile application A in the rich execution environment and mobile application B in the trusted execution environment) to the management servers of the mobile applications (e.g., mobile application A in the rich execution environment and mobile application B in the trusted execution environment). In this case, the management servers of the mobile applications (e.g., mobile application A in the rich execution environment and mobile application B in the trusted execution environment) may only generate the service keys of the mobile applications (e.g., mobile application A in the rich execution environment and mobile application B in the trusted execution environment), and send the generated service keys of the mobile applications (e.g., mobile application A in the rich execution environment and mobile application B in the trusted execution environment) to the management server of the security application. The management server of the security application may send the communication security protection keys and the service keys of the mobile applications (e.g., mobile application A in the rich execution environment and mobile application B in the trusted execution environment) to the security application, and the management servers of the mobile applications (e.g., mobile application A in the rich execution environment and mobile application B in the trusted execution environment) may send the communication security protection keys of the mobile applications (e.g., mobile application A in the rich execution environment and mobile application B in the trusted execution environment) to the corresponding mobile applications (e.g., mobile application A in the rich execution environment and mobile application B in the trusted execution environment).

Generally speaking, the communication security protection keys of the mobile applications adopt asymmetric keys. For example, keys saved by the mobile applications are public keys, and keys saved by the security application are private keys. The algorithm for the asymmetric keys may include any one of RSA, Elgamal, knapsack algorithm, Rabin, D-H, and ECC.

When initiating service operation requests such as decryption operation requests, the mobile applications (e.g., mobile application A in the rich execution environment and mobile application B in the trusted execution environment) may encrypt service data by using the communication security protection public keys saved by the mobile applications (e.g., mobile application A in the rich execution environment and mobile application B in the trusted execution environment), and send the encrypted service data to the security application. Optionally, the mobile applications may also initiate encryption operation requests, requesting the security application to encrypt the service data. In the case of using asymmetric keys as the service keys, signature requesting or signature verification operation requests may further be initiated.

After receiving the service data encrypted by the mobile applications (e.g., mobile application A in the rich execution environment and mobile application B in the trusted execution environment) by using the communication security protection public keys of the mobile applications (e.g., mobile application A in the rich execution environment and mobile application B in the trusted execution environment), the security application may perform decryption by using the communication security protection private keys of the mobile applications (e.g., mobile application A in the rich execution environment and mobile application B in the trusted execution environment) to obtain the service data. Subsequently, the security application may decrypt the service data by using the service keys of the mobile applications (e.g., mobile application A in the rich execution environment and mobile application B in the trusted execution environment), and may send the decrypted service data to the mobile applications (e.g., mobile application A in the rich execution environment and mobile application B in the trusted execution environment). The mobile applications may then use the decrypted service data to complete subsequent service processes. The service keys may be symmetric keys or asymmetric keys. The algorithm for the symmetric keys may include any one of DES, AES, and MD5, and the algorithm for the asymmetric keys may include any one of RSA, Elgamal, knapsack algorithm, Rabin, D-H, and ECC.

Optionally, after decrypting the service data by using the service keys of the mobile applications (e.g., mobile application A in the rich execution environment and mobile application B in the trusted execution environment), the security application may also sign the decrypted service data by using the communication security protection private keys of the mobile applications (e.g., mobile application A in the rich execution environment and mobile application B in the trusted execution environment), and send the signed decrypted service data to the mobile applications (e.g., mobile application A in the rich execution environment and mobile application B in the trusted execution environment). The mobile applications (e.g., mobile application A in the rich execution environment and mobile application B in the trusted execution environment) may verify the signatures by using the corresponding communication security protection public keys to obtain the decrypted service data.

The above system can complete distribution of communication security protection keys and service keys, so that several mobile applications in the trusted execution environment sharing one security application can be realized.

Figure 12:
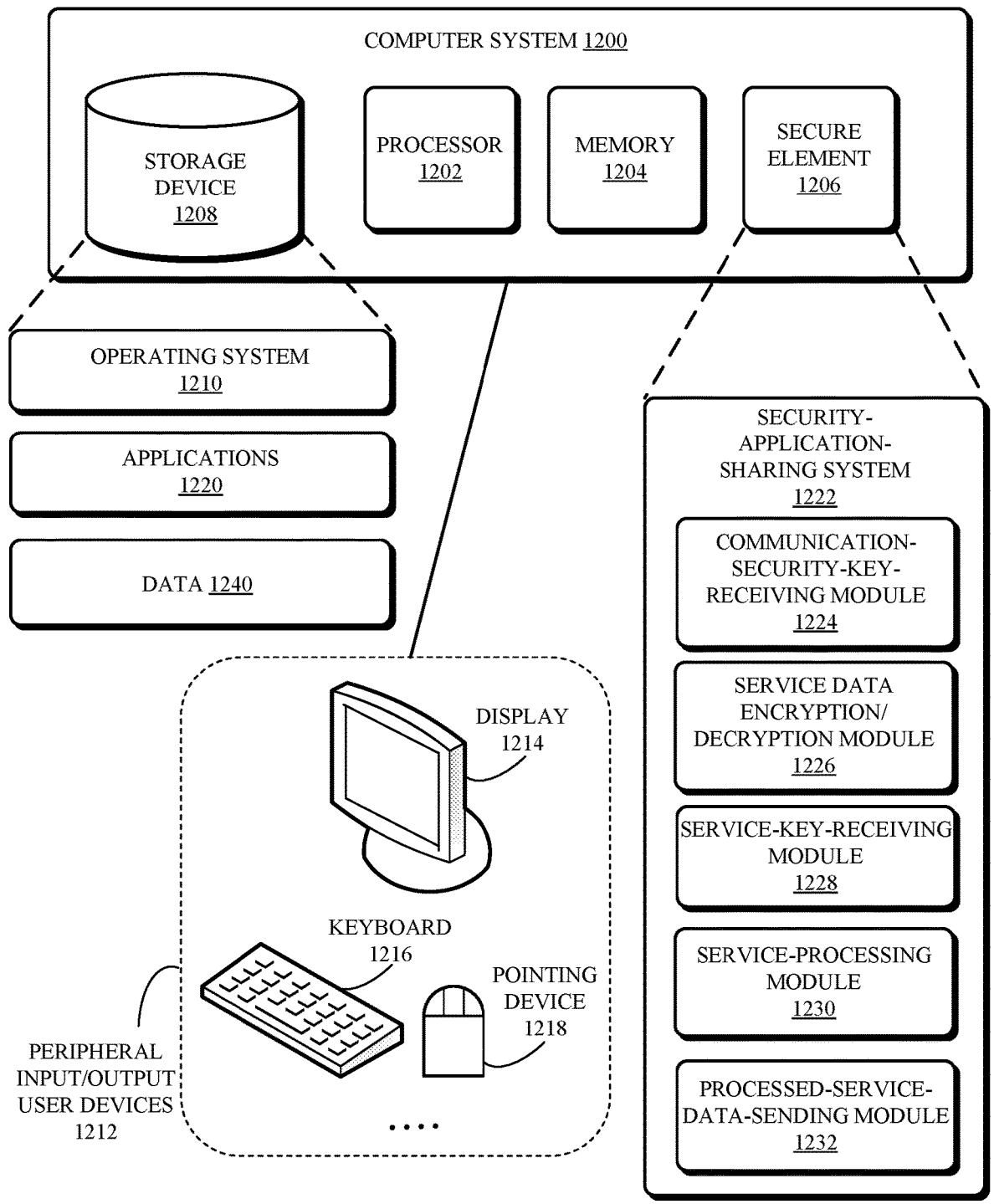
FIG. 12 illustrates an exemplary computer and communication system for sharing a security application according to one embodiment.

FIG. 12 illustrates an exemplary computer and communication system for sharing a security application according to one embodiment. In FIG. 12, computer system 1200 can include a processor 1202, a memory 1204, a secure element 1206, and a storage device 1208. Furthermore, computer system 1200 can be coupled to peripheral input/output (I/O) user devices 1212, e.g., a display device 1214, a keyboard 1216, and a pointing device 1218. Storage device 1208 can store an operating system 1210, one or more applications 1220, and data 1240. Secure element 1206 can store a security-application-sharing system 1222.

Applications 1220 can include instructions, which can be loaded from storage device 1208 into memory 1204 and executed by processor 1202. As a result, computer system 1200 can perform specific functions provided by applications 1220. In some embodiments, processor 1202 can include a trusted execution environment and/or a rich execution environment such that applications 1220 can be executed in the trusted execution environment and/or the rich execution environment.

Security-application-sharing system 1222 can include instructions, which when executed by computer system 1200, can cause computer system 1200 or secure element 1206 to perform methods and/or processes described in this disclosure. Specifically, security-application-sharing system 1222 can include instructions for receiving communication security keys (communication-security-key-receiving module 1224), instructions for encrypting and decrypting service data received from applications, such as applications 1220 (service data encryption/decryption module 1226), instructions for receiving service keys (service-key-receiving module 1228), instructions for processing services based on the service keys (service-processing module 1230), and instructions for sending processed service data back to applications, such as applications 1220 (processed-service-data-sending module 1232).

In some embodiments, applications 1220 and the various modules in security-application-sharing system 1222, such as modules 1224, 1226, 1228, 1230, and 1232 can be partially or entirely implemented in hardware. Further, in some embodiments, the system may not include a separate processor and memory. Instead, in addition to performing their specific tasks, modules 1220, 1224, 1226, 1228, 1230, and 1232, either separately or in concert, may be part of general- or special-purpose computation engines.

Figure 13:
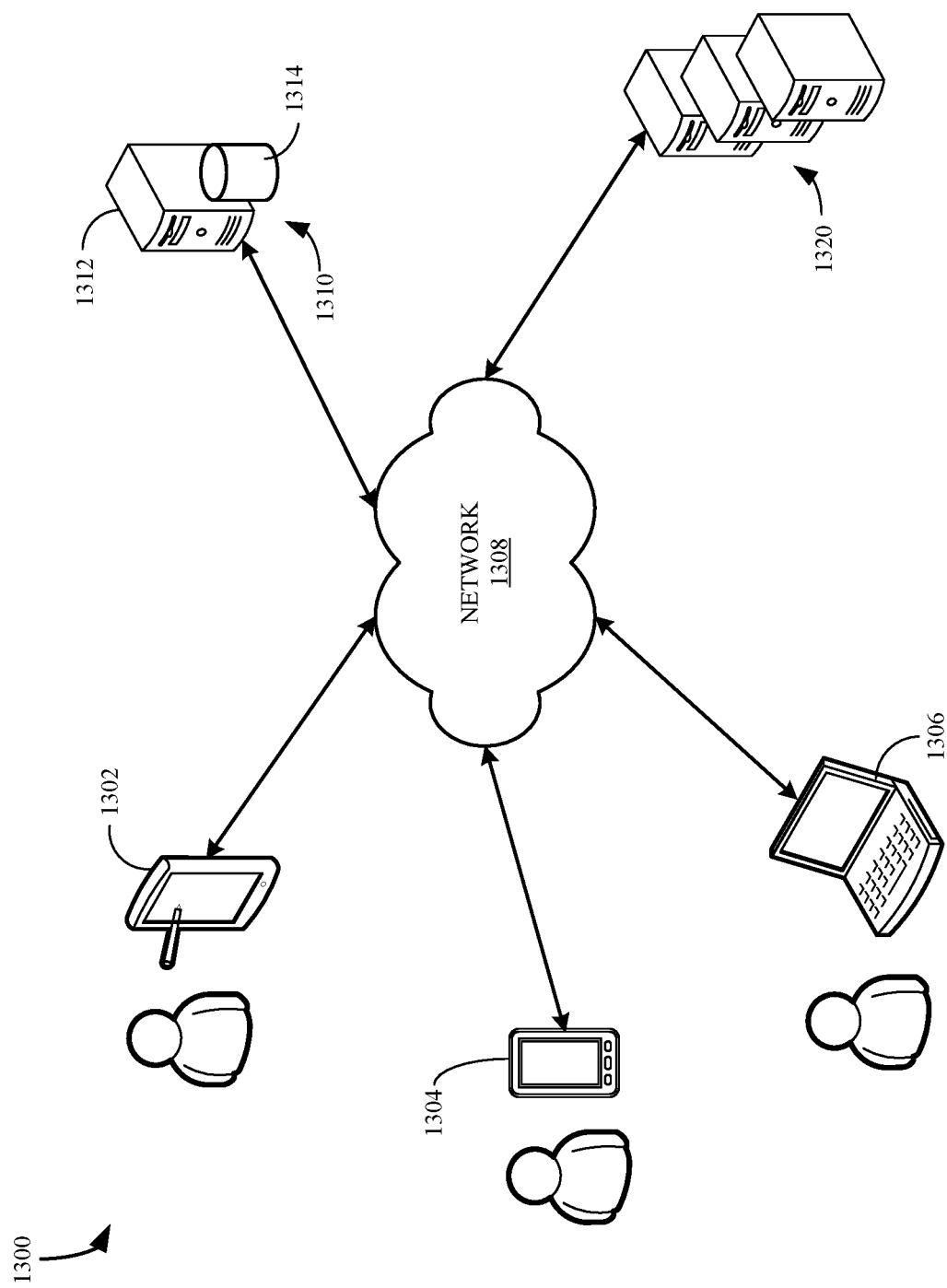
FIG. 13 illustrates an exemplary network environment for implementing the disclosed technology, in accordance with some embodiments described herein.

FIG. 13 illustrates an exemplary network environment for implementing the disclosed technology, in accordance with some embodiments described herein. A network environment 1300 includes a number of electronic devices 1302, 1304 and 1306 communicably connected to a server 1310 by a network 1308. One or more remote servers 1320 are further coupled to the server 1310 and/or the one or more electronic devices 1302, 1304 and 1306.

In some exemplary embodiments, electronic devices 1302, 1304 and 1306 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 1302, 1304 and 1306 store a user agent such as a browser or application. In the example of FIG. 13, electronic device 1302 is depicted as a tablet computer, electronic device 1304 is depicted as a smartphone, and electronic device 1306 is depicted as a laptop computer.

Server 1310 includes a processing device 1312 and a data store 1314. Processing device 1312 executes computer instructions stored in data store 1314, for example, to assist in scheduling a customer-initiated service or a service-provider-initiated service between a service provider and a customer at electronic devices 1302, 1304 and 1306 during a service scheduling process.

In some exemplary aspects, server 1310 can be a single computing device such as a computer server. In other embodiments, server 1310 can represent more than one computing device working together to perform the actions of a server computer (e.g., cloud computing). The server 1310 may host the web server communicably coupled to the browser at the client device (e.g., electronic devices 1302, 1304 or 1306) via network 1308. In one example, the server 1310 may host a client application for scheduling a customer-initiated service or a service-provider-initiated service between a service provider and a customer during a service scheduling process. Server 1310 may further be in communication with one or more remote servers 1320 either through the network 1308 or through another network or communication means.

The one or more remote servers 1320 may perform various functionalities and/or storage capabilities described herein with regard to the server 1310, either alone or in combination with server 1310. Each of the one or more remote servers 1320 may host various services. For example, servers 1320 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 1320 can be a single computing device such as a computer server or can represent more than one computing device working together to perform the actions of a server computer (e.g., cloud computing). In one embodiment server 1310 and one or more remote servers 1320 may be implemented as a single server or a cluster of servers. In one example, server 1310 and one or more remote servers 1320 may communicate through the user agent at the client device (e.g., electronic devices 1302, 1304 or 1306) via network 1308.

Users may interact with the system hosted by server 1310, and/or one or more services hosted by remote servers 1320, through a client application installed at the electronic devices 1302, 1304, and 1306. Alternatively, the user may interact with the system through a web-based browser application at the electronic devices 1302, 1304, and 1306. Communication among client devices 1302, 1304, 1306 and the system, and/or one or more services, may be facilitated through a network (e.g., network 1308).

Communication among the client devices 1302, 1304, 1306, server 1310 and/or one or more remote servers 1320 may be facilitated through various communication protocols. In some aspects, client devices 1302, 1304, 1306, server 1310 and/or one or more remote servers 1320 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 1308 can include, for example, any one or more of a personal area network (PAN), a local area network (LAN), a campus area network (CAN), a metropolitan area network (MAN), a wide area network (WAN), a broadband network (BBN), the Internet, and the like. Further, network 1308 can include, but is not limited to, any one or more of the following network topologies, including a bus network, a star network, a ring network, a mesh network, a star-bus network, a tree or hierarchical network, and the like.

Through the embodiments provided in the present application, using one security application to perform data processing for a plurality of mobile applications with unified requirements may be implemented, thus reducing costs of the mobile applications using a secure element for secure computing and speeding up the popularization of secure computing based on secure elements.

Those skilled in the art should understand that the embodiments of the present invention may be provided as methods, systems, or computer program products. Therefore, the present invention may take the form of hardware only embodiments, software only embodiments, or embodiments combining software and hardware. Moreover, the present invention may use the form of a computer program product implemented on a plurality of computer-usable storage media (including, but not limited to, a magnetic disk memory, a CD-ROM, an optical memory, and so on) containing computer-usable program code therein.

The present invention is described with reference to the flowcharts and/or block diagrams of the method, the device (system), and the computer program product according to the embodiments of the present invention. It should be understood that each flow and/or block in the flowcharts and/or block diagrams and a combination of the flows and/or blocks in the flowcharts and/or block diagrams may be implemented by computer program instructions. These computer program instructions may be provided to a processor of a general-purpose computer, a special-purpose computer, an embedded processor, or any other programmable data processing device to produce a machine, so that instructions executed by the processor of the computer or other programmable data processing device generate an apparatus for implementing a specified function in one or a plurality of procedures in the flowcharts and/or one or a plurality of blocks in the block diagrams.

These computer program instructions may also be stored in a computer readable memory capable of directing a computer or other programmable data processing device in a particular manner, such that instructions stored in the computer-readable memory produce a manufacturing product that includes an instruction device that implements the functions specified in one or more processes in a flowchart and/or one or more blocks in a block diagram.

These computer program instructions may also be loaded onto a computer or other programmable data processing device such that a series of operating steps are performed on the computer or other programmable device to produce computer-implemented processing, so that instructions executed on the computer or other programmable device provide steps for implementing the functions specified in one or more processes in a flowchart and/or one or more blocks in a block diagram.

In a typical configuration, the computing device includes a plurality of processors (CPUs), input/output interfaces, network interfaces, and memories.

The memory may include a computer-readable medium in the form of a non-permanent memory, a random access memory (RAM) and/or a non-volatile memory or the like, such as a read-only memory (ROM) or a flash memory (flash RAM). The memory is an example of a computer-readable medium.

The computer-readable medium includes permanent and non-permanent, movable and non-movable media that can achieve information storage by means of any methods or techniques. The information may be computer-readable instructions, data structures, modules of programs or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by a computing device. According to the definitions herein, the computer-readable medium does not include transitory computer-readable media (transitory media), such as a modulated data signal and a carrier wave.

It is also important to note that the terms "including", "comprising" or any other variant thereof are intended to cover non-exclusive inclusion, such that processes, methods, goods or devices, including a series of elements, include not only those elements but also other elements not explicitly listed, or also include elements inherent to such processes, methods, goods or equipment. In the absence of more restrictions, the element defined by the statement "including one . . . " does not exclude other identical elements in the process, method, commodity or equipment that includes the element.

Those skilled in the art should understand that embodiments of the present application may be provided as a method, a system, or a computer program product. Therefore, the present application may use the form of a full hardware embodiment, a full software embodiment, or an embodiment combining software and hardware. Moreover, the present application may use the form of a computer program product implemented on a plurality of computer-usable storage media (including, but not limited to, a magnetic disk memory, a CD-ROM, an optical memory, and so on) containing computer-usable program code therein.

The above descriptions are merely the embodiments of the present application, and are not intended to limit the present application. For those skilled in the art, the present application may have various alterations and changes. Any modifications, equivalent substitutions, improvements and the like made within the spirit and principle of the present application shall fall within the scope of the claims of the present application.

What is claimed is:

1. A computer-executed method, comprising:
receiving, by a set of security applications, respective service keys associated with a plurality of applications executed on a terminal device, wherein the set of security applications resides in a secure element within the terminal device, and wherein the service keys of the plurality of applications are securely isolated in the security application;
receiving, by the set of security applications, service data associated with the plurality of applications;
processing, by a first security application of the set of security applications, service data from a first portion of the plurality of applications, respectively, based on service keys corresponding to the first portion of the plurality of applications;
processing, by a second security application of the set of security applications, service data from a second portion of the plurality of applications, respectively, based on service keys corresponding to the second portion of the plurality of applications; and
returning, by the set of security applications, the processed service data to the plurality of applications, thereby facilitating the plurality of applications in performing service based on the processed service data.

2. The method according to claim 1, further comprising:
receiving, by the set of security applications, a communication security protection key associated with a first application of the plurality of applications, wherein receiving the service data comprises receiving encrypted service data; and performing decryption using the communication security protection key on the received encrypted service data to obtain the service data.

3. The method according to claim 2, wherein the communication security protection key is generated by a management server of the set of security applications or a management server of the first application.

4. The method according to claim 2, wherein the communication security protection key comprises one of:
a symmetric key; and
a private key of an asymmetric key pair, and wherein a public key of the asymmetric key pair is used by the first application to encrypt the service data.

5. The method according to claim 1, wherein the service keys are generated by a management server of the set of security applications or a management server of the plurality of applications.

6. The method according to claim 1, wherein a respective service key comprises one of:
a symmetric key; and
a private or public key of an asymmetric key pair.

7. The method according to claim 1, wherein a respective application of the plurality of applications is executed in a trusted computing environment or a rich execution environment within the terminal device.

8. A computer system, comprising:
processing circuitry;
a storage device coupled to the processor and storing instructions, which when executed by the processor cause the processor to perform a method, the method comprising:
receiving, by a set of security applications, respective service keys associated with a plurality of applications executed on a terminal device, wherein the set of security applications resides in a secure element within the terminal device, and wherein the service keys of the plurality of applications are securely isolated in the security application;
receiving, by a first security application of the set of security applications, service data associated with the plurality of applications;
processing, by the set of security applications, service data from a first portion of the plurality of applications, respectively, based on service keys corresponding to the first portion of the plurality of applications;
processing, by a second security application of the set of security applications, service data from a second portion of the plurality of applications, respectively, based on service keys corresponding to the second portion of the plurality of applications; and
returning, by the set of security applications, the processed service data to the plurality of applications, thereby facilitating the plurality of applications in performing service based on the processed service data.

9. The computer system according to claim 8, wherein the method further comprises:
receiving, by the set of security applications, a communication security protection key associated with a first application of the plurality of applications, wherein receiving the service data comprises receiving encrypted service data; and
performing decryption using the communication security protection key on the received encrypted service data to obtain the service data.

10. The computer system according to claim 9, wherein the communication security protection key is generated by a management server of the set of security applications or a management server of the first application.

11. The computer system according to claim 9, wherein the communication security protection key comprises one of:
a symmetric key; and
a private key of an asymmetric key pair, and wherein a public key of the asymmetric key pair is used by the first application to encrypt the service data.

12. The computer system according to claim 8, wherein the service keys are generated by a management server of the set of security applications or a management server of the plurality of applications.

13. The computer system according to claim 8, wherein a respective service key comprises one of:
a symmetric key; and
a private or public key of an asymmetric key pair.

14. The computer system according to claim 8, wherein a respective application of the plurality of applications is executed in a trusted computing environment or a rich execution environment within the terminal device.

15. A non-transitory computer-readable storage medium storing instructions that when executed by a computer cause the computer to perform a method, the method comprising:
receiving, by a set of security applications, respective service keys associated with a plurality of applications executed on a terminal device, wherein the set of security applications resides in a secure element within the terminal device, and wherein the service keys of the plurality of applications are securely isolated in the security application;
receiving, by the set of security applications, service data associated with the plurality of applications;
processing, by a first security application of the set of security applications, service data from a first portion of the plurality of applications, respectively, based on service keys corresponding to the first portion of the plurality of applications;
processing, by a second security application of the set of security applications, service data from a second portion of the plurality of applications, respectively, based on service keys corresponding to the second portion of the plurality of applications; and
returning, by the set of security applications, the processed service data to the plurality of applications, thereby facilitating the plurality of applications in performing service based on the processed service data.

16. The non-transitory computer-readable storage medium to claim 15, wherein the method further comprises:
receiving, by the set of security applications, a communication security protection key associated with a first application of the plurality of applications, wherein receiving the service data comprises receiving encrypted service data; and
performing decryption using the communication security protection key on the received encrypted service data to obtain the service data.

17. The non-transitory computer-readable storage medium to claim 16, wherein the communication security protection key is generated by a management server of the set of security applications or a management server of the first application.

18. The non-transitory computer-readable storage medium to claim 16, wherein the communication security protection key comprises one of:

a symmetric key; and a private key of an asymmetric key pair, and wherein a public key of the asymmetric key pair is used by the first application to encrypt the service data.

* * * * *